United States Patent
Stitt et al.

(10) Patent No.: US 11,150,317 B2
(45) Date of Patent: Oct. 19, 2021

(54) CIRCULAR POLARIZED ANGLE OF ARRIVAL MEASURING SYSTEM

(71) Applicants: DENSO International America, Inc., Southfield, MI (US); DENSO CORPORATION, Kariya (JP)

(72) Inventors: Raymond Michael Stitt, Ada, MI (US); John Videtich, Zeeland, MI (US); Warren Guthrie, West Olive, MI (US); Karl Jager, Holland, MI (US); Thomas Peterson, Holland, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 239 days.

(21) Appl. No.: 16/445,468

(22) Filed: Jun. 19, 2019

(65) Prior Publication Data
US 2019/0391224 A1    Dec. 26, 2019

Related U.S. Application Data

(60) Provisional application No. 62/687,633, filed on Jun. 20, 2018, provisional application No. 62/826,129, (Continued)

(51) Int. Cl.
*G01S 3/48* (2006.01)
*G01S 3/04* (2006.01)
(Continued)

(52) U.S. Cl.
CPC .............. *G01S 3/48* (2013.01); *B60R 25/245* (2013.01); *G01S 3/043* (2013.01);
(Continued)

(58) Field of Classification Search
CPC .................................. G01S 3/48; G01S 3/043
(Continued)

(56) References Cited

U.S. PATENT DOCUMENTS

| 9,688,247 B1 | 6/2017 | Jayaraman et al. |
| 9,894,492 B1 | 2/2018 | Elangovan et al. |
| (Continued) | | |

FOREIGN PATENT DOCUMENTS

| BR | 10201401746 | 2/2016 |
| CN | 10457459 | 4/2015 |
| (Continued) | | |

OTHER PUBLICATIONS

U.S. Appl. No. 16/445,385, filed Jun. 19, 2019, Guthrie, et al.
U.S. Appl. No. 16/445,430, filed Jun. 19, 2019, Guthrie, et al.

*Primary Examiner* — Bo Fan
(74) *Attorney, Agent, or Firm* — Harness, Dickey & Pierce, P.L.C.

(57) ABSTRACT

Methods and systems are disclosed and include receiving a signal via a first communication channel at a plurality of azimuth angles. The method includes determining a plurality of first communication channel phase angle differences between a pair of antennas. The method includes receiving a second signal via a second communication channel and at the plurality of azimuth angles. The method includes determining a plurality of second communication channel phase angle differences between the pair of antennas that each correspond to one of the plurality of azimuth angles. The method includes generating a first reference curve based on the plurality of first communication channel phase angle differences. The method includes generating a second reference curve based on the plurality of second communication channel phase angle differences. The method also includes generating a calibration curve that is based on an (Continued)

interpolation of the first reference curve and the second reference curve.

24 Claims, 30 Drawing Sheets

Related U.S. Application Data filed on Mar. 29, 2019, provisional application No. 62/826,145, filed on Mar. 29, 2019, provisional application No. 62/687,485, filed on Jun. 20, 2018, provisional application No. 62/687,505, filed on Jun. 20, 2018, provisional application No. 62/826,111, filed on Mar. 29, 2019.

(51) Int. Cl.
*H01Q 3/36* (2006.01)
*H01Q 11/08* (2006.01)
*H01Q 21/00* (2006.01)
*B60R 25/24* (2013.01)
*G07C 9/00* (2020.01)
*H01Q 21/29* (2006.01)
*H04W 88/02* (2009.01)
*B60R 25/20* (2013.01)

(52) U.S. Cl.
CPC ........... *G07C 9/00309* (2013.01); *H01Q 3/36* (2013.01); *H01Q 11/08* (2013.01); *H01Q 11/083* (2013.01); *H01Q 21/0043* (2013.01); *H01Q 21/29* (2013.01); *H04W 88/02* (2013.01); *B60R 25/209* (2013.01); *B60R 25/24* (2013.01)

(58) Field of Classification Search
USPC .......................... 342/363, 29, 394, 387, 442
See application file for complete search history.

(56) References Cited

U.S. PATENT DOCUMENTS

| | | |
|---|---|---|
| 10,002,479 B2 | 6/2018 | Oz et al. |
| 2011/0215921 A1 | 9/2011 | Ben Ayed et al. |
| 2012/0045058 A1 | 2/2012 | Weghaus |
| 2014/0274013 A1 | 9/2014 | Santavicca |
| 2015/0148989 A1 | 5/2015 | Cooper et al. |
| 2015/0161832 A1 | 6/2015 | Esselink et al. |
| 2015/0310681 A1 | 10/2015 | Avery et al. |
| 2015/0356797 A1 | 12/2015 | McBride et al. |
| 2016/0150407 A1 | 5/2016 | Michaud et al. |
| 2017/0029107 A1* | 2/2017 | Emami ................ G08G 5/0069 |
| 2017/0062938 A1 | 3/2017 | Cheng et al. |
| 2017/0104589 A1 | 4/2017 | Lambert et al. |
| 2017/0132533 A1 | 5/2017 | Darnell et al. |
| 2017/0309098 A1 | 10/2017 | Watters et al. |
| 2017/0330402 A1 | 11/2017 | Menard et al. |
| 2018/0029560 A1 | 2/2018 | Mohaupt et al. |
| 2018/0099643 A1 | 4/2018 | Golsch et al. |
| 2018/0103414 A1 | 4/2018 | Golsch |
| 2018/0126952 A1 | 5/2018 | Niemiec |
| 2018/0154865 A1 | 6/2018 | Bianchi, III et al. |
| 2018/0269565 A1 | 9/2018 | Guthrie et al. |

FOREIGN PATENT DOCUMENTS

| | | |
|---|---|---|
| WO | WO-16156682 A1 | 10/2016 |
| WO | WO-2017181050 A1 | 10/2017 |
| WO | WO-18040641 A1 | 3/2018 |

\* cited by examiner

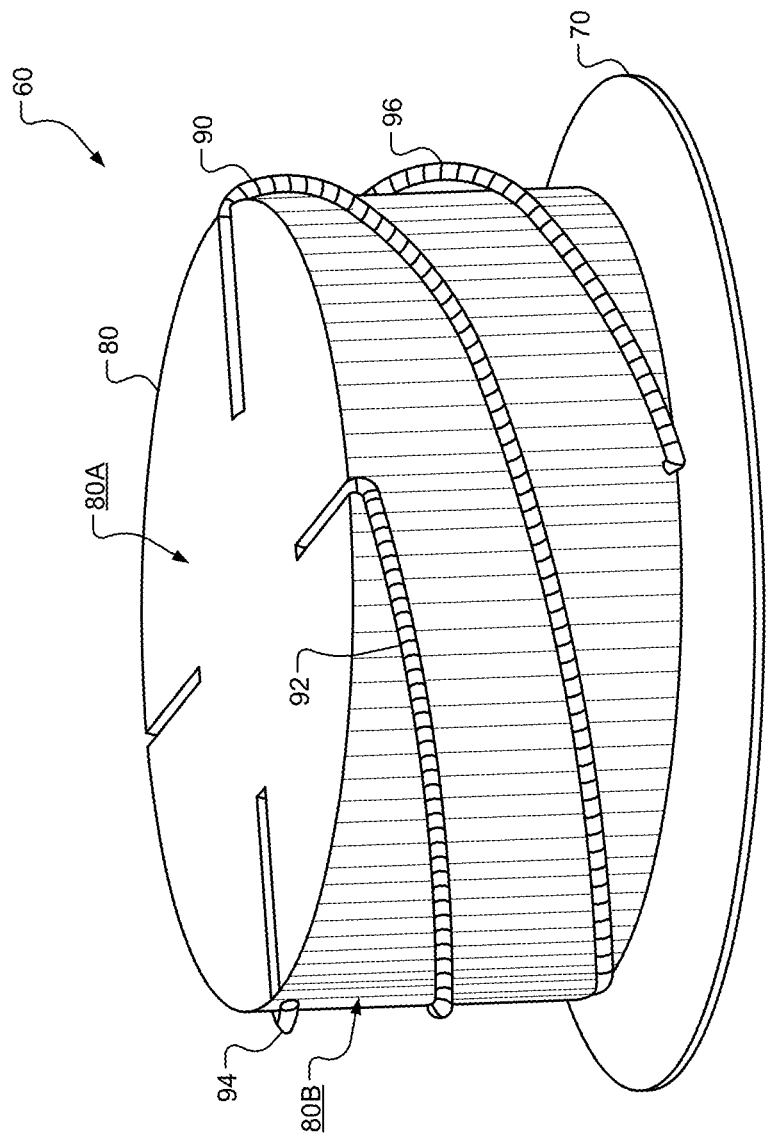

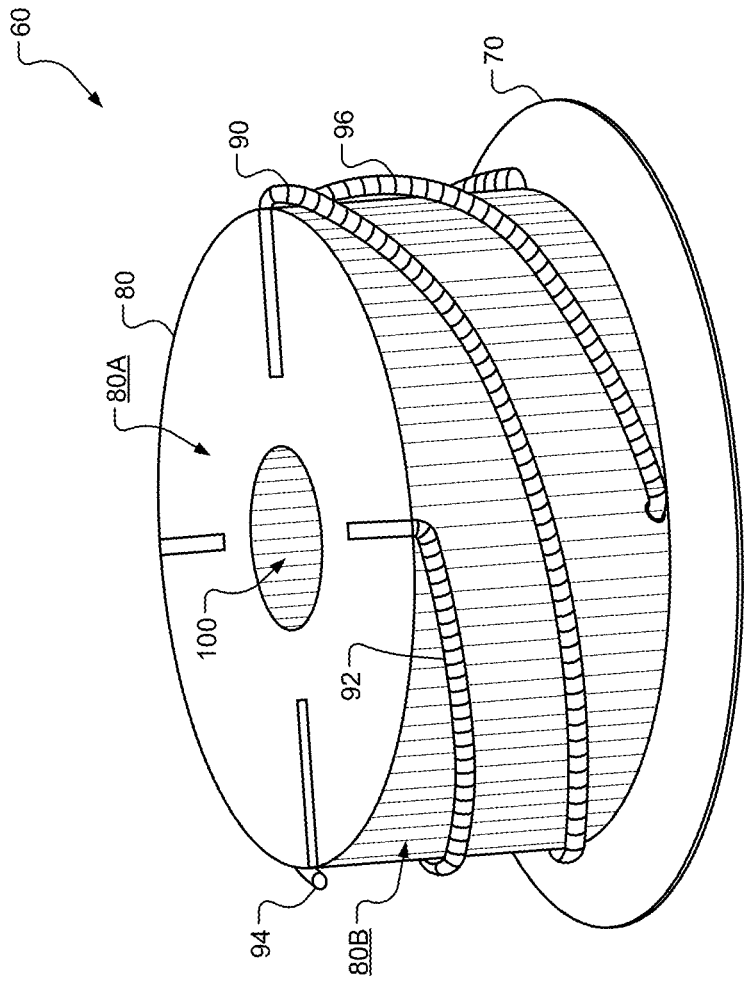

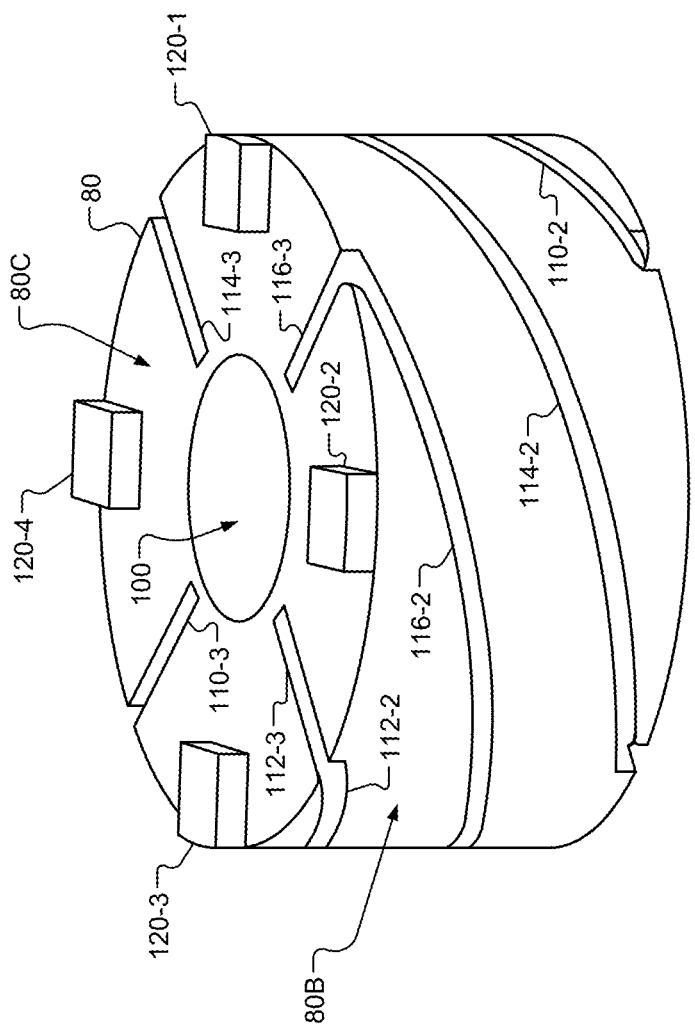

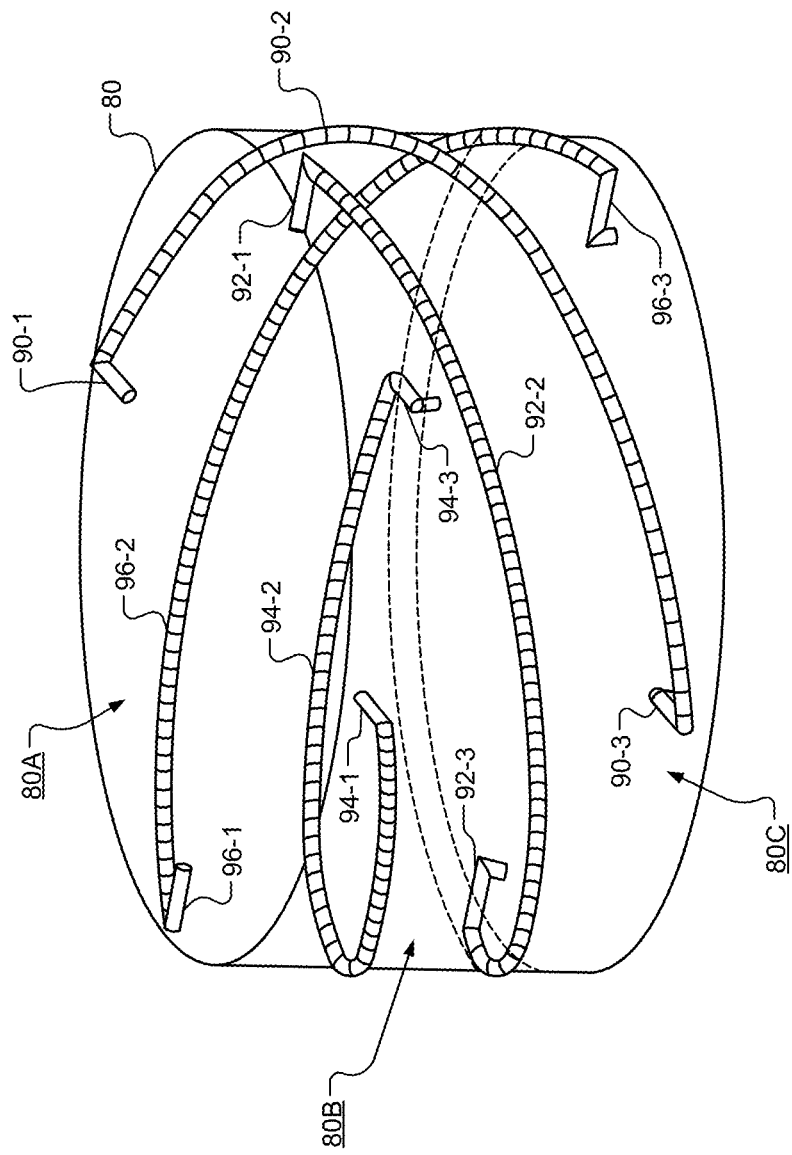

CIRCULAR POLARIZED ANGLE OF ARRIVAL MEASURING SYSTEM

CROSS-REFERENCE TO RELATED APPLICATIONS

This application claims the benefit of U.S. Provisional Application No. 62/687,485, filed on Jun. 20, 2018, U.S. Provisional Application No. 62/826,111, filed Mar. 29, 2019, U.S. Provisional Application No. 62/687,505, filed on Jun. 20, 2018, U.S. Provisional Application No. 62/826,129, filed Mar. 29, 2019, U.S. Provisional Application No. 62/687,633, filed on Jun. 20, 2018 and U.S. Provisional Application No. 62/826,145, filed Mar. 29, 2019. The entire disclosures of the above applications are incorporated herein by reference.

FIELD

The present disclosure relates to circular polarized angle of arrival measurement systems and methods.

BACKGROUND

This section provides background information related to the present disclosure and is not necessarily prior art.

Conventional passive entry/passive start (PEPS) systems, which are vehicle systems that include a keyless entry system, may provide a user access to various vehicle functions if the user possesses a key fob that has been previously paired with a vehicle's central PEPS electronic control unit (ECU). As an example, the user in possession of the key fob may unlock and enter the vehicle by grabbing the door handle. As another example, the user in possession of the key fob may activate a vehicle function by pushing a button on the key fob. In response to pushing the button, the central PEPS ECU authenticates the key fob to determine if the key fob is authorized to access the vehicle and uses the signal strength obtained by a plurality of sensors to estimate the distance between the key fob and the vehicle and the location of the key fob relative to the vehicle. If the key fob is authenticated and is located within an authorizing zone, the PEPS system makes the corresponding vehicle function available to the user (i.e., the vehicle is started).

Conventional PEPS systems use proprietary grade radio protocols using low frequency (LF) signals of approximately 125 kHz. LF systems were implemented by conventional PEPS systems because the wave propagation enables relatively accurate estimation of a distance between the key fob and the vehicle and the location of the key fob relative to the vehicle by using signal strengths within a target activation range of, for example, 2 meters. However, due to the extremely long wavelength of the LF signal relative to the size of a vehicle antenna and key fob receiver, it is difficult to reliably communicate with a key fob using LF systems beyond a few meters within reasonable power consumption and safe transmit power levels. As such, it is difficult to make any of the vehicle's functions available to the user when the key fob is located more than a few meters away from the vehicle.

Accordingly, key fobs are presently being implemented by smart devices, such as smartphones and wearable devices, wherein the smart devices are able to communicate at a range greater than the activation range of LF systems, such as 100 meters. As such, smart devices enable the availability of various vehicle functions and long range distancing features, such as passive welcome lighting, distance bounding on remote parking applications, etc.

However, antenna systems of current PEPS systems may prevent the PEPS system from accurately estimating RSSI power, distances and angles for RSSI power, differential RSSI power, trilateration measurements, triangulation measurements, and correlation finger printing locationing values for signal transmission between the key fob and the vehicle. Antenna systems of current PEPS system may also prevent the PEPS system from accurately estimating the location of the key fob relative to the vehicle.

SUMMARY

This section provides a general summary of the disclosure, and is not a comprehensive disclosure of its full scope or all of its features.

An apparatus is disclosed and includes a body having pathways, where: each of the pathways includes a first portion, a second portion, and a third portion; the first portion of each of the pathways is located on a first surface of the body; the second portion of each of the pathways is located on a second surface of the body; the second portion of each of the pathways forms a helical shape; the third portion of each of the pathways is located on a third surface of the body; the first surface and the second surface are non-parallel; and the third surface and the second surface are non-parallel. The apparatus includes: antenna elements, where each of the antenna elements is disposed in a respective one of the pathways, and the antenna elements are configured to receive radio frequency (RF) signals; and a ground plane coupled to a first end of each of the antenna elements.

In some embodiments, the ground plane is a first layer of multiple layers of a printed circuit board. In some embodiments, the body includes an aperture extending through a middle portion of the body. In some embodiments, the apparatus includes an encasing element physically coupled to the second surface of the body. In some embodiments, the encasing element includes a dielectric material. In some embodiments, the encasing element and the ground plane cooperate to define a gap.

In some embodiments, a first end of each of the antenna elements is located above the first surface of the body. In some embodiments, the antenna elements each are connected to at least one impedance matching circuit. In some embodiments, each of the at least one impedance matching circuit includes at least one of (i) an inductor and a capacitor, and (ii) a balun. In some embodiments, an encasing element and the body cooperate to define a gap.

In some embodiments, the apparatus includes a coupler circuit electrically connected to the antennas elements and combines antenna element signals into to a single signal at phase offsets near even divisions of 360°, for example, at or near 0°, 90°, 180° and 270° for an antenna (or antenna system) with four antenna elements. In some embodiments, the coupler circuit includes discrete resistors, capacitors, inductors, and delay lines.

In some embodiments, the coupler circuit includes hybrid devices. In some embodiments, the coupler circuit is printed or etched within a printed circuit board. In some embodiments, the body is composed of high dielectric material allowing the size of the apparatus to be reduced. In some embodiments, the body is composed of a material that is injection moldable. In some embodiments, the pathways include slots. In some embodiments, the antenna elements are flat metal bands. In some embodiments, the antenna elements are stampings. In some embodiments, the antenna elements are printed, deposited or etched onto the body. In some embodiments, the antenna elements are conductors.

In some embodiments, the ground plane is a layer of multiple layers of a printed circuit board. In some embodiments, the ground plane is a conducting layer below a conducting pad layer of multiple layers of a printed circuit board.

In some embodiments, the antenna elements are through-hole soldered to the printed circuit board. In some embodiments, the antenna elements are surface-mount soldered to pads on the printed circuit board. In some embodiments, the antenna elements are press-fit into the printed circuit board. In some embodiments, the antenna elements along the first surface of the body are sized to tune the antenna frequency performance. In some embodiments, the antenna elements along the third surface of the body and the printed circuit board pads are sized and positioned from the ground plane to tune the antenna frequency performance.

In some embodiments, the body includes plastic heat stakes that protrude through a printed circuit board and are melted to attach an assembly of the antenna elements to the printed circuit board.

In some embodiments, the body includes antenna element supporting protrusions that extend outward away from the body and support portions of the antenna elements. In some embodiments, the antenna elements are (i) through-hole soldered to a printed circuit board, (ii) surface-mount soldered to pads on the printed circuit board, or (iii) press-fit into the printed circuit board. In some embodiments, the body includes a centrally located recessed notch or indentation.

A system is disclosed and includes bodies. Each of the bodies has multiple pathways and multiple antenna elements, where: each of the pathways includes a first portion, a second portion, and a third portion; the first portion of each of the pathways is located on a first surface of the respective body; the second portion of each of the pathways is located on a second surface of the respective body; the second portion of each of the pathways forms a helical shape; the third portion of each of the pathways is located on a third surface of the respective body; the first surface and the second surface of the respective body are non-parallel; and the third surface and the second surface of the respective body are non-parallel. Each of the antenna elements is disposed in a respective one of the pathways, and the antenna elements are configured to receive RF signals. The system also includes a ground plane coupled to a first end of each of the antenna elements.

In some embodiments, the ground plane is a first layer of multiple layers of a printed circuit board. In some embodiments, each of the bodies includes an aperture extending through a middle portion of the respective body.

In some embodiments, the second surface of each of the bodies is physically coupled to a respective one of multiple encasing elements. In some embodiments, the encasing elements include a dielectric material. In some embodiments, the ground plane and each of the encasing elements cooperate to define a respective gap.

In some embodiments, a first end of each of the antenna elements is located above the first surface of the respective body. In some embodiments, the antenna elements are each connected to at least one impedance matching circuit. In some embodiments, the at least one impedance matching circuit includes at least one of (i) an inductor and a capacitor, and (ii) a balun. In some embodiments, a first line that includes a center point of each of the bodies is parallel to a second line that includes a center point of the ground plane.

In some embodiments, the system may include a coupler circuit electrically connected to the antenna elements and configured to combine the antenna element signals into to a single signal at phase offsets near even divisions of 360°, e.g., near 0°, 90°, 180° and 270° for an antenna with four antenna elements. In some embodiments, the coupler may be constructed of discrete resistors, capacitors, inductors and delay lines. In some embodiments, parts of the coupler may be printed or etched within a printed circuit board.

In some embodiments, the body is composed of high dielectric material allowing the size of the apparatus to be reduced. In some embodiments, the body is composed of a material that is injection moldable. In some embodiments, the pathways include slots. In some embodiments, the antenna elements are flat metal bands. In some embodiments, the antenna elements are stampings. In some embodiments, the antenna elements are printed or deposited or etched onto the body. In some embodiments, the antenna elements are conductors.

In some embodiments, the ground plane is a first conducting layer after a conducting pad layer of multiple layers of a printed circuit board. In some embodiments, the antenna elements are through-hole soldered to the printed circuit board.

In some embodiments, the antenna elements are surface-mount soldered to pads on the printed circuit board. In some embodiments, the antenna elements are press-fit into the printed circuit board. In some embodiments, the antenna elements along the first surface of the body are sized to tune the antenna frequency performance. In some embodiments, the antenna elements along the third surface of the body and the printed circuit board pads surface are sized and positioned from the ground plane to tune the antenna frequency performance.

In some embodiments, the bodies include plastic heat stakes protruding through printed circuit boards and melted to attach an assembly of the antenna elements to the printed circuit board.

A system is disclosed and includes antennas, where each of the antennas (i) includes multiple conductive elements and (ii) is circularly polarized. The conductive elements are configured to receive RF signals. A first end of each of the conductive elements is electrically coupled to a printed circuit board (PCB). The PCB includes multiple coupler circuits and a switching circuit. Each of the coupler circuits is configured to combine the RF signals received at respective input ports. Each of the coupler circuits is configured to output a signal to the switching circuit based on the combined RF signals. The switching circuit is configured to selectively output one of the signals based on at least one control port of the switching circuit being selectively activated by a control signal. The system also includes a microcontroller configured to determine, using a processor that is configured to execute instructions stored in a non-transitory computer-readable medium and based on at least one of the signals, an angle of arrival associated with the antennas, or an RSSI associated with the plurality of antennas, a round trip time of flight between the antennas and another radio module, or a carrier phase based ranging distance associated with the antennas with another radio module. The processor may in addition or alternatively to performing the stated determinations transmit an angle of departure signal associated with the antennas or a consistent power level RSSI signal associated with the antennas.

In some embodiments, two or more antennas are disposed along a line parallel to a line that the processor is measuring angle of arrival or transmitting angle of departure.

In some embodiments, the coupler circuits include discrete resistors, capacitors, inductors, and/or delay lines. In some embodiments, the coupler circuits include hybrid devices. In some embodiments, the coupler circuits are printed or etched layers of a printed circuit board.

In some embodiments, the switching circuit is configured to: selectively receive or transmit the one of the signals associated with a first antenna of the antennas in response to receiving the control signal at a first control port; selectively receive or transmit a second signal associated with a second antenna of the multiple antennas in response to receiving the control signal at a second control port; and selectively receive or transmit a third signal associated with a third antenna of the multiple antennas in response to receiving the control signal at the first control port and the second control port.

In some configurations, the system includes a control voltage generator circuit configured to provide the control signal to the at least one control port. In some configurations, the system includes a control voltage generator circuit configured to: receive a first logic signal, where the first logic signal has a first voltage value; and generate the control signal having a second voltage value by adjusting the first voltage value of the first logic signal. In some configurations, the control voltage generator circuit is a voltage regulator circuit. In some configurations, the second voltage value is configured to provide power to the switching circuit.

In some configurations, the system includes a voltage regulator circuit configured to: receive a power signal from a power source, where the power signal has a first voltage value; and generate a first logic signal having a logic voltage value by adjusting the first voltage value of the power signal, where the logic voltage value is less than the first voltage value, and the logic voltage value is configured to provide power to the switching circuit. In some configurations, the system includes an electrostatic discharge protection circuit configured to protect the switching circuit from being subjected to an electrostatic discharge.

In some configurations, the system includes input filter circuits that electrically couple a respective coupler circuit to the switching circuit. In some configurations, each of the input filter circuits includes a decoupling capacitor.

In some configurations, each antenna includes: a body having pathways, where: each of the pathways includes a first portion, a second portion, and a third portion; the first portion of each of the pathways is located on a first surface of the body; the second portion of each of the pathways is located on a second surface of the body; the second portion of each of the pathways forms a helical shape; the third portion of each of the pathways is located on a third surface of the body; and each of the conductive elements is disposed in a respective one of the pathways.

In some configurations, the first end of each of the conductive elements is capacitively coupled to a ground plane of the PCB. In some configurations, the system includes point to point, or multi-drop electronic communication interfaces to another peripheral device. In some configurations the system includes a local interconnect network (LIN) electronic communication interface to another peripheral device. In some configurations, the system includes a LIN transceiver that is configured to communicate with a peripheral device via a LIN bus.

In some configurations, the microcontroller is configured to determine, based on the signals, a phase angle difference associated with the pairs of antennas among the antennas. In some configurations, the phase angle value refers to an angle between in-phase and quadrature-phase components of a signal.

In some configurations, the microcontroller is configured to receive the one of the signals associated with a first antenna of the multiple antennas; and the microcontroller is configured to determine a phase angle value associated with the one of the antennas based on the one of the signals.

In some configurations, the microcontroller is configured to determine, based on the signals, an angle of arrival associated with the signals and the antennas. In some configurations, the microcontroller is configured to determine, based on the signals, an RSSI associated with the signals and the antennas.

In some configurations, the microcontroller is configured to determine, based on the signals, a round trip time of flight based distance associated with the signals and the antennas and other radio modules. In some configurations, the microcontroller is configured to determine, based on the signals, a carrier phase based ranging distance associated with the signals and the antennas and other radio modules.

In some configurations, the microcontroller is configured to receive a second signal associated with a second antenna of the multiple antennas; the microcontroller is configured to determine a phase angle value associated with the second antenna of the multiple antennas based on the second signal; and the microcontroller is configured to determine the phase angle difference based on (i) the phase angle value associated with the one of the antennas and (ii) the phase angle value associated with the second antenna of the antennas.

In some configurations, the microcontroller is configured to transmit at least one of: (i) the phase angle difference value associated with the one of the antennas to a peripheral device, (ii) the angle of arrival value associate with phase angle difference value corresponding to a RF signal transmitted between one pair of the antennas and a peripheral device, (iii) RSSI information to a peripheral device, (iv) round trip time of flight distance information between the antennas and the peripheral device, and (iv) carrier phase based ranging distance information to a peripheral device, (v) a phase angle value associated with a second antenna of the antennas for signal transmitted to or from the peripheral device, and (vi) the phase angle difference for signal transmission to or from the peripheral device. In some configurations, the microcontroller includes a Bluetooth® transceiver circuit that is configured to communicate with a peripheral device via a Bluetooth® communication link.

In some configurations, the microcontroller is commanded by a peripheral device to take measurements of selected RF device address messages. In some configurations, the microcontroller is commanded by a peripheral device to take measurements on (or "sniff") RF devices communicating with each other, or broadcasting. This may be done while the microcontroller does not have a RF connection with the RF devices. In some configurations, the microcontroller is configured to transmit fixed RSSI base power levels to other radio modules, based upon signals it sends to the antennas. In some configurations, the microcontroller is configured to transmit angle of departure information to other radio modules, based upon signals it sends to the antennas.

In some configurations, the microcontroller includes a Bluetooth® transceiver circuit that is configured to communicate with another device via a Bluetooth® communication link. In some configurations, the microcontroller includes a Bluetooth® low energy transceiver circuit that is configured to communicate with another device via a Bluetooth® communication link.

In some configurations, the first end of a set of the conductive elements is connected to an impedance matching circuit that electrically couples the conductive elements to a ground plane of the PCB. In some configurations, the impedance matching circuit includes a balun.

A method is disclosed and includes receiving, using an antenna system, a signal via a first communication channel, wherein the antenna system receives the signal at azimuth angles. The method also includes determining, using a processing circuit that is configured to execute instructions stored in a non-transitory computer readable medium, first communication channel phase angle differences between a pair of antennas of the antenna system. Each of the first communication channel phase angle differences corresponds to one of the azimuth angles. The method includes receiving, using the antenna system, a second signal via a second communication channel, where the antenna system receives the second signal at the azimuth angles.

The method further includes determining, using the processing circuit, second communication channel phase angle differences between the pair of antennas, where each of the second communication channel phase angle differences corresponds to one of the azimuth angles. The method includes generating, using the processing circuit, a first reference curve based on the first communication channel phase angle differences. The method also includes generating, using the processing circuit, a second reference curve based on the second communication channel phase angle differences. The method includes generating, using the processing circuit, a calibration curve, where the calibration curve is based on an interpolation of the first reference curve and the second reference curve.

In some embodiments, the method includes determining, using the processing circuit, phase angle difference limits, where each of the phase angle difference limits is associated with one of the first communication channel and second communication channel.

In some embodiments, the method includes storing, using the processing circuit, the calibration curve and the phase angle difference limits in a calibration index. In some embodiments, calibration index values of the calibration index vary by radio frequency and/or communication channel. In some embodiments, generating the first reference curve further comprises filtering, using the processing circuit, the first communication channel phase angle differences using a low-pass filter.

In some embodiments, generating the second reference curve further comprises filtering, using the processing circuit, the second communication channel phase angle differences using the low-pass filter. In some embodiments, the low-pass filter is a finite impulse response low-pass filter.

In some embodiments, the interpolation of the first reference curve and the second reference curve is an average of (i) the phase angle difference of the first reference curve and (ii) the phase angle difference of the second reference curve.

In some embodiments, the method includes generating, using the processing circuit, additional reference curves, where each of the additional reference curves is associated with one of each remaining communication channel of the antenna system.

In some embodiments, the method includes generating, using the processing circuit, the calibration curve based on an interpolation of the first reference curve, the second reference curve, and each of the additional reference curves.

In some embodiments, the first communication channel, the second communication channel, and each of the remaining communication channels are associated with a Bluetooth® communication system.

A system is disclosed and includes an antenna system, where the antenna system is configured to receive: a signal via a first communication channel and at azimuth angles; and a second signal via a second communication channel and at the azimuth angles. The system also includes a processing circuit that is configured to execute instructions stored in a non-transitory computer readable medium. The instructions include determining, using the processing circuit, first communication channel phase angle differences between a pair of antennas of the antenna system, where each of the first communication channel phase angle differences corresponds to one of the azimuth angles. The instructions include determining, using the processing circuit, second communication channel phase angle differences between the pair of antennas, where each of the second communication channel phase angle differences corresponds to one of the azimuth angles. The instructions include generating, using the processing circuit, a first reference curve based on the first communication channel phase angle differences. The instructions include generating, using the processing circuit, a second reference curve based on the second communication channel phase angle differences. The instructions also include generating, using the processing circuit, a calibration curve, where the calibration curve is based on an interpolation of the first reference curve and the second reference curve.

In some embodiments, the instructions further include determining, using the processing circuit, phase angle difference limits, where each of the phase angle difference limits is associated with one of the first communication channel and second communication channel. In some embodiments, the instructions further comprise storing, using the processing circuit, the calibration curve and the phase angle difference limits in a calibration index.

In some embodiments, generating the first reference curve further includes filtering, using the processing circuit, the first communication channel phase angle differences using a low-pass filter. In some embodiments, generating the second reference curve further includes filtering, using the processing circuit, the second communication channel phase angle differences using the low-pass filter. In some embodiments, the low-pass filter is a finite impulse response low-pass filter.

In some embodiments, the interpolation of the first reference curve and the second reference curve is an average of (i) the phase angle difference of the first reference curve and (ii) the phase angle difference of the second reference curve.

In some embodiments, the instructions further include generating, using the processing circuit, additional reference curves, where each of the additional reference curves is associated with one of each remaining communication channel of the antenna system. In some embodiments, the instructions further include generating, using the processing circuit, the calibration curve based on an interpolation of the first reference curve, the second reference curve, and each of the additional reference curves.

In some embodiments, the first communication channel, the second communication channel, and each of the remaining communication channels are associated with a Bluetooth® communication system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 6A-6B are illustrations of an example antenna assembly (or antenna) of the antenna system in accordance with an embodiment of the present disclosure.

FIGS. 7A-7D are illustrations of an example antenna including multiple antenna elements in accordance with an embodiment of the present disclosure.

FIGS. 8-9 are illustrations of another example antenna including antenna elements in accordance with an embodiment of the present disclosure.

Corresponding reference numerals indicate corresponding parts throughout the several views of the drawings.

DETAILED DESCRIPTION

Figure 1:
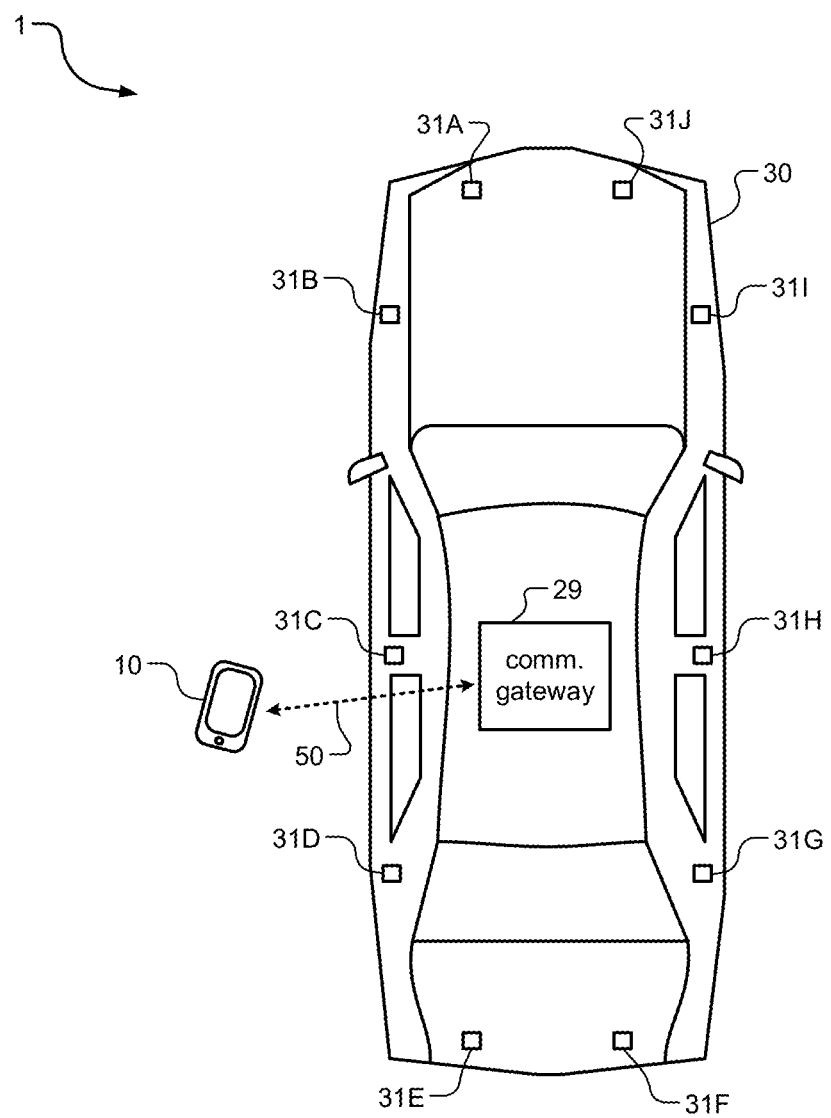
FIG. 1 is an illustration of a vehicle and a portable device in accordance with an embodiment of the present disclosure.

Antennas that receive and/or transmit in a linear polarized pattern having a typical "doughnut" shape cannot be placed near metal of a vehicle because the antenna and metal form a combined antenna system. The metal of the vehicle electromagnetically shorts out the antenna, which reduces link margin. Link margin refers to an amount of power needed in a received signal in order to differentiate, for example, 1 s and 0 s of the received signal.

Linear polarized antennas in typical microlocating systems have small link margin when the antennas are cross polarized to with antennas in key fobs or smart devices. Antennas of key fobs are typically linear polarized antennas. The power transferred over the link and in a particular direction varies wildly as orientation of the linear polarized key fob antenna changes in a typical reflective environment. This degrades microlocation performance in a PEPS system. The circular polarized quadrifilar helix antenna electronics disclosed herein overcomes these limitations.

Circular polarized patch antennas and electronics can be placed on ground planes and near ground planes, but they need large ground planes behind them to become directional. Large metal ground planes are not readily available in the areas of the outside of a vehicle that are composed of plastic. Using a ground plane to make a directional antenna increases the size of the module, reducing the areas where the module may be packaged in a vehicle, which can make the module less useful. Also, traditional circular polarized patch antennas, couple in the RF domain to the ground plane, cause an array of antennas to couple together reducing angle of arrival and angle of departure microlocation performance.

Circular polarized antennas that radiate in two half hemispheres, such as a patch antenna, exhibit better microlocation performance when implemented in a PEPS system than linear polarized antennas. Circular polarized antennas may be placed close to metal of a vehicle. In so doing, the metal of the vehicle may be used as a ground plane. The circular polarized antennas in combination with the ground plane provide a half hemisphere radiation pattern. The circular polarized antennas capacitively couple to the ground plane and the power or ground lines of the corresponding electronics. This coupling creates an antenna system with a center of reception that varies as cabling and physical placement of the antenna electronic system varies, which can degrade PEPS system performance.

The circular polarized antennas may be placed to abut the metal of the vehicle, but cannot be placed at arbitrary distances from the metal of the vehicle because the metal may short the antenna system. To radiate in one direction, the circular polarized antennas need electronics module ground planes or vehicle body metal ground planes that are about a signal wavelength across is size. As a result, packaging the PEPS modules in a vehicle is difficult and not practical. Depending on the packaging, PEPS system performance can be negatively affected.

The examples set forth herein include use of quadrifilar helix antennas having half hemisphere circular polarized radiation patterns that minimize link power variation, provide directional reception, have an radio frequency (RF) center, and minimize phase variation error with variation of key fob antenna polarization. Key fob polarization variation may be due to key fob construction and key fob position and orientation relative to the quadrifilar helix antennas. Quadrifilar helix antennas may be placed at arbitrary distances from each other and/or metal of a vehicle and may include require ground planes that are not larger than the antennas. Quadrifilar helix antennas may also be placed close together in various angular measuring configurations. These characteristics improve PEPS system performance and PEPS system vehicle packaging for received signal strength indicator (RSSI), angle of arrival, angle of departure, round trip time of flight, and carrier phase-based ranging microlocation techniques. This quadrifilar helix antenna construction allows the size of the antennas to be reduced while tuning the antenna frequencies to a give band. This quadrifilar helix antenna construction allows signal receive characteristics to be similar regardless of the orientation of a key fob.

Example embodiments will now be described more fully with reference to the accompanying drawings.

Figure 2:
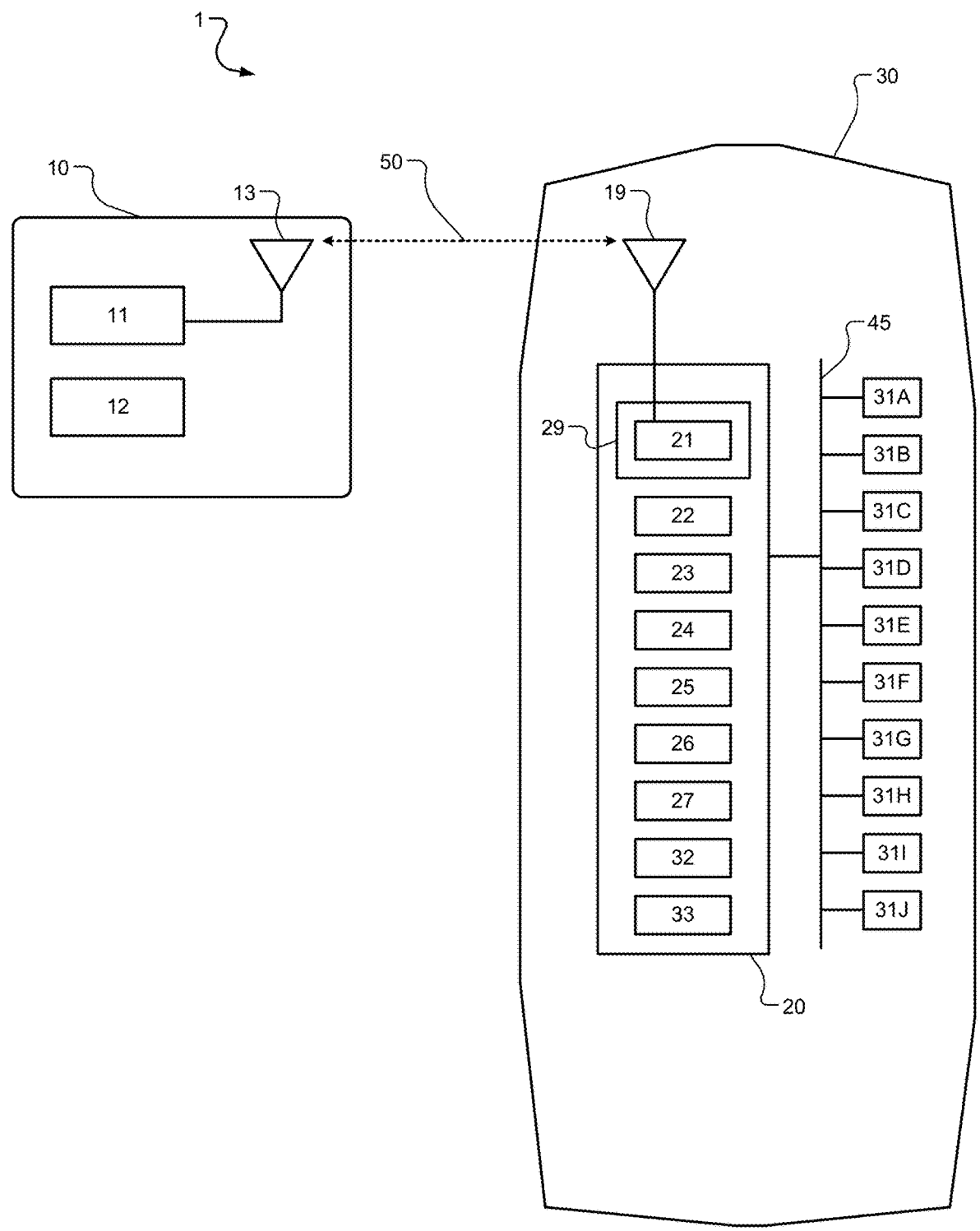
FIG. 2 is a functional block diagram of a vehicle and a portable device in accordance with an embodiment of the present disclosure.

With reference to FIGS. 1-2, a PEPS system 1 is provided within a vehicle 30 and includes a communication gateway 29, sensors 31A-31J (collectively referred to as sensors 31), and a control module 20. The communication gateway 29 may be configured or programmed to measure or exchange RSSIs, angle-of-departure-transmission values, angle-of-arrival-reception values, round trip time of flight values, and/or carrier phase based ranging information. While FIGS. 1-2 illustrate ten sensors 31A-31J, any number of sensors may be used. Each of the sensors 31 may be configured or programmed to measure or exchange RSSIs, angle-of-departure-reception values, angle-of-arrival-transmission values, round trip time of flight values, and/or carrier phase based ranging information. Furthermore, while FIG. 2 illustrates one control module 20, the PEPS system 1 may include one or more control modules 20 that are distributed throughout the vehicle 30.

The one or more control modules 20 and the sensors 31 may communicate with each other using a vehicle interface 45. As an example, the vehicle interface 45 may include a controller area network (CAN) bus for communication between main modules. As another example, the vehicle interface 45 may include a local interconnect network (LIN) for lower data-rate communication. In other embodiments, the vehicle interface 45 may include a clock extension peripheral interface (CXPI) bus. Additionally or alternatively, the vehicle interface 45 may include any combination of the CAN bus, LIN, CXPI, radio frequency, and electronic bus communication interfaces.

The control module 20 includes the communication gateway 29, which includes a wireless communication chipset (or transceiver) 21 connected to one or more antennas 19. For example, the wireless communication chipset 21 may be a Bluetooth low energy (BLE) communication chipset that utilizes the BLE communication protocol. Alternatively, other wireless communication protocols, such as Wi-Fi or Wi-Fi directed, may be used. As shown in FIG. 2, the antennas 19 may be located in the vehicle 30. Alternatively, the antennas 19 may be located outside of the vehicle 30 or within the control module 20. The control module 20 may also include a link authentication module 22 that authenticates the portable device 10 for communication via communication link 50. As an example, the link authentication module 22 may be configured to execute challenge-response authentication or other cryptographic verification algorithms in order to authenticate the portable device 10.

The control module 20 may also include a data management layer 23 for push data. As an example, the data management layer 23 is configured obtain vehicle information obtained by any of the modules (e.g., location information obtained by a telematics module 26) and transmit the vehicle information to the portable device 10.

The control module 20 may also include a connection information distribution module 24 that is configured to obtain information corresponding to the communication channels and channel switching parameters of the communication link 50 and transmit the information to the sensors 31. In response to the sensors 31 receiving the information from the connection information distribution module 24 via the vehicle interface 45 and the sensors 31 being synchronized with the communication gateway 29, the sensors 31 may locate and follow, or eavesdrop on, the communication link 50.

The control module 20 may also include a timing control module 25, which obtains timing information corresponding to the communication link 50 when the link authentication module 22 executes challenge-response authentication. Furthermore, the timing control module 25 is configured to provide the timing information to the sensors 31 via the vehicle interface 45.

The control module 20 may also include the telematics module 26, which is configured to generate location information and/or error of location information associated with the vehicle 30. The telematics module 26 may be implemented by a global navigation satellite system (e.g., GPS), inertial navigation system, global system for mobile communication (GSM) system, or other location system.

The control module 20 may also include a security filtering module 33 that is configured to detect violations of the physical layer and protocol and filter the data accordingly before providing the information to a sensor processing and localization module 32. The security filtering module 33 may also be configured to flag data as injected so that the sensor processing and localization module 32 may discard the flagged data and alert the PEPS system 1. The data from the sensor processing and localization module 32 is provided to a PEPS module 27, which is configured to read vehicle state information from the sensors 31 in order to detect user intent to access a vehicle function and to compare the location of the portable device 10 to the set of locations that authorize certain functions, such as unlocking a door of the vehicle 30 and/or starting the vehicle 30.

In order to carry out the above functionality of the various modules described above, the control module 20 may also include one or more processors that are configured to execute instructions stored in a non-transitory computer-readable medium, such as a read-only memory (ROM) and/or random access memory (RAM).

As shown in FIGS. 1-2, a portable device 10 may communicate with the communication gateway 29 of the vehicle 30 via the communication link 50. Without limitation, the portable device 10 may be, for example, any Bluetooth-enabled communication device, such as a smart phone, smart watch, wearable electronic device, key fob, tablet device, Bluetooth transmitter device, or other device associated with a user of the vehicle 30, such as an owner, driver, passenger of the vehicle 30, and/or a technician for the vehicle 30. Additionally or alternatively, the portable device 10 may be configured for wireless communication via another wireless communication protocol, such as Wi-Fi and/or Wi-Fi direct. The communication link 50 may be a Bluetooth communication link as provided for and defined by the Bluetooth specification. As an example, the communication link 50 may be a BLE communication link. Alternatively, the communication link 50 may be a Wi-Fi or Wi-Fi direct communication link.

The portable device 10 may include a wireless communication chipset (or transceiver) 11 connected to an antenna 13. The wireless communication chipset 11 may be a BLE communication chipset. Alternatively, the wireless communication chipset 11 may be a Wi-Fi or Wi-Fi direct communication chipset. The portable device 10 may also include application code 12 that is executable by the processor of the portable device 10 and stored in a non-transitory computer-readable medium, such as a read-only memory (ROM) or a random-access memory (RAM). Based on the application code 12 and using the wireless communication chipset 11 and the antenna 13, the portable device 10 may be configured to execute various instructions corresponding to, for example, authentication of the communication link 50, transmission of location and/or velocity information obtained by a global navigation satellite system (e.g., GPS) sensor or accelerometer of the portable device 10, and manual activation of a vehicle function.

Figure 3:
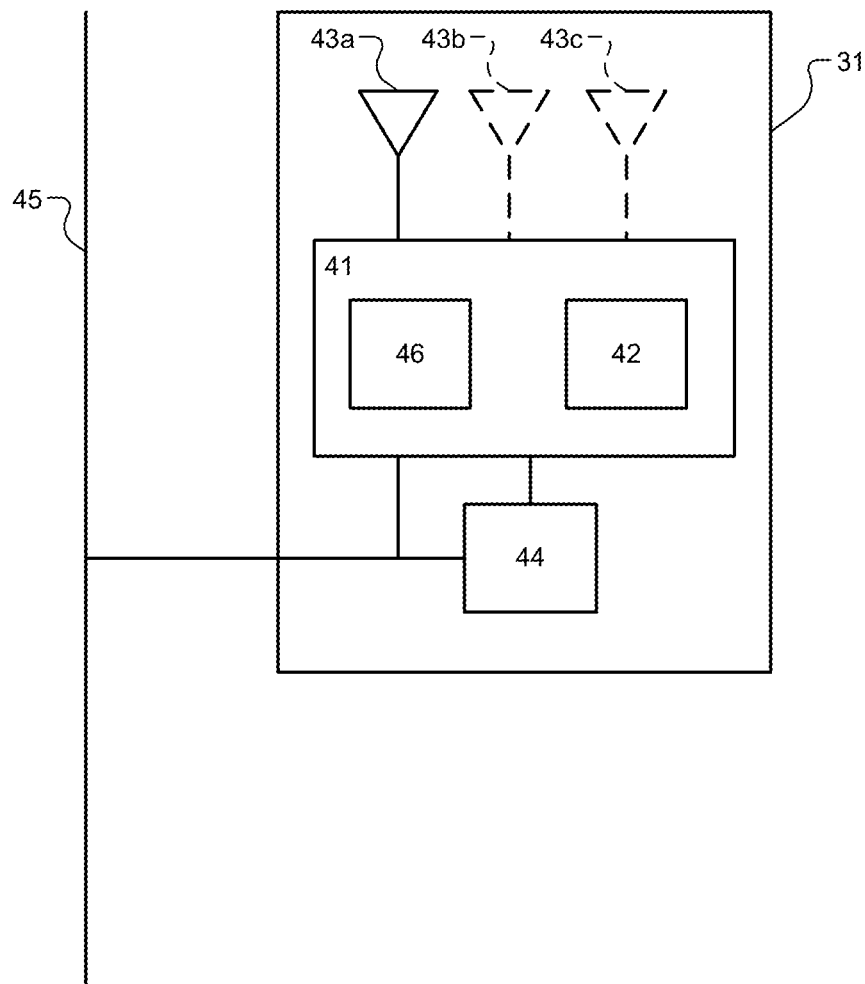
FIG. 3 is a functional block diagram of a sensor of a vehicle in accordance with an embodiment of the present disclosure.

With reference to FIG. 3, each of the sensors 31 includes a wireless communication chipset 41 connected to an antenna (or antenna assembly) 43, which may include multiple antenna elements. Any number of antennas 43 may be included in each of the sensors 31. In FIG. 3, three antennas 43a, 43b, and 43c are shown. The wireless communication chipset 41 may be a BLE communication chipset. Alternatively, the wireless communication chipset 41 may be a Wi-Fi or Wi-Fi direct communication chipset. As shown in FIG. 3, the antennas 43 may be located internal to the sensors 31. Alternatively, the antennas 43 may be located external to the sensors 31. The antennas 43 are described below in further detail with reference to FIGS. 5-12.

The control module 20 and, more specifically, the communication gateway 29, can establish a secure communication connection, such as communication link 50, with the portable device 10. For example, the control module 20 can establish a secure communication connection using the BLE communication protocol. The control module 20 can then communicate information about the secure communication connection, such as timing and synchronization information, to each of the sensors 31. For example, the control module 20 can communicate information about the secure communication connection, such as the timing of the next communication connection event, the timing interval between communication connection events, the communication channel for the next communication connection event, a channel map, a channel hop interval or offset to calculate the channel for subsequent communication connection events, communication latency information, communication jitter information, etc. The sensors 31 can then eavesdrop on communication packets sent by the portable device to the control module 20 and can measure signal information of the signals received from the portable device 10. For example, the sensors 31 can measure the received signal strength and determine a received signal strength indicator (RSSI) value. Additionally or alternatively, the sensors 31 can determine other measurements of the signals received from the portable device 10, such as an angle of arrival, a time of arrival, angle of departure, a time difference of arrival, round trip time of flight distance, carrier phase based-ranging distance, etc.

The sensors 31 can then communicate the measured information to the control module 20, which can then determine a location of the portable device 10 or a distance to the portable device 10 based on the measured information received from each of the sensors 31. For example, the control module 20 can determine the location of the portable device 10 based on, for example, the patterns of the RSSI values for the various signals received from the portable device 10 by the various sensors 31. For example, a relatively strong RSSI generally indicates that the portable device 10 is closer and a relatively weak RSSI generally indicates that the portable device 10 is farther away. By analyzing the RSSI for communication signals sent by the portable device 10 with each of the sensors 31, the control module 20 can determine a location of or distance to the portable device 10 relative to the vehicle 30. Additionally or alternatively, angle of arrival or time difference of arrival measurements for the signals sent by the portable device 10 and received by the sensors 31 can also be used by the control module 20 to determine the location of the portable device 10. Additionally or alternatively, the sensors 31 themselves can determine a location of the portable device 10 or distance to the portable device 10 based on the measured information and can communicate the location or distance to the control module 20.

Based on the determined location or distance of the portable device 10 relative to the vehicle 30, the PEPS system 1 can then authorize or perform a vehicle function, such as unlocking a door of the vehicle 30, unlocking a trunk of the vehicle 30, starting the vehicle 30, and/or allowing the vehicle 30 to be started. For example, if the portable device 10 is less than a first distance threshold to the vehicle 30, the PEPS system 1 can activate interior or exterior lights of the vehicle 30. If the portable device 10 is less than a second distance threshold to the vehicle, the PEPS system 1 can unlock doors or a trunk of the vehicle 30. If the portable device 10 is located inside of the vehicle 30, the PEPS system 1 can allow the vehicle 30 to be started.

With reference to FIG. 3, when the BLE communication protocol is used, the sensors 31 receive BLE signals using the antennas 43 and, specifically, receive BLE physical layer messages using a BLE physical layer (PHY) controller 46. The sensors 31 can be configured to observe BLE physical layer messages and obtain measurements of the physical properties of the associated signals, including, for example, the received signal strength indication (RSSI) using a channel map that is produced by a channel map reconstruction module 42. Additionally or alternatively, the sensors 31 may communicate with each other and/or communicate with the communication gateway 29 via the vehicle interface 45 to determine time difference of arrival, time of arrival, or angle of arrival data for signals received by multiple sensors 31.

A timing synchronization module 44 is configured to accurately measure the reception times of messages on the vehicle interface 45 and pass the timing information to the wireless communication chipset 41. The wireless communication chipset 41 is configured to tune the PHY controller 46 to a specific channel at a specific time based on the channel map information and the timing signals. Furthermore, when the BLE communication protocol is used, the wireless communication chipset 41 is configured to observe all physical layer messages and data that conform to the Bluetooth physical layer specification, which includes the normal data rates proposed or adopted in, for example, the Bluetooth Specification version 5.0. The data, timestamps, and measured signal strength may be reported by the wireless communication chipset 41 to the various modules of the control module 20 via the vehicle interface 45.

Figure 4:
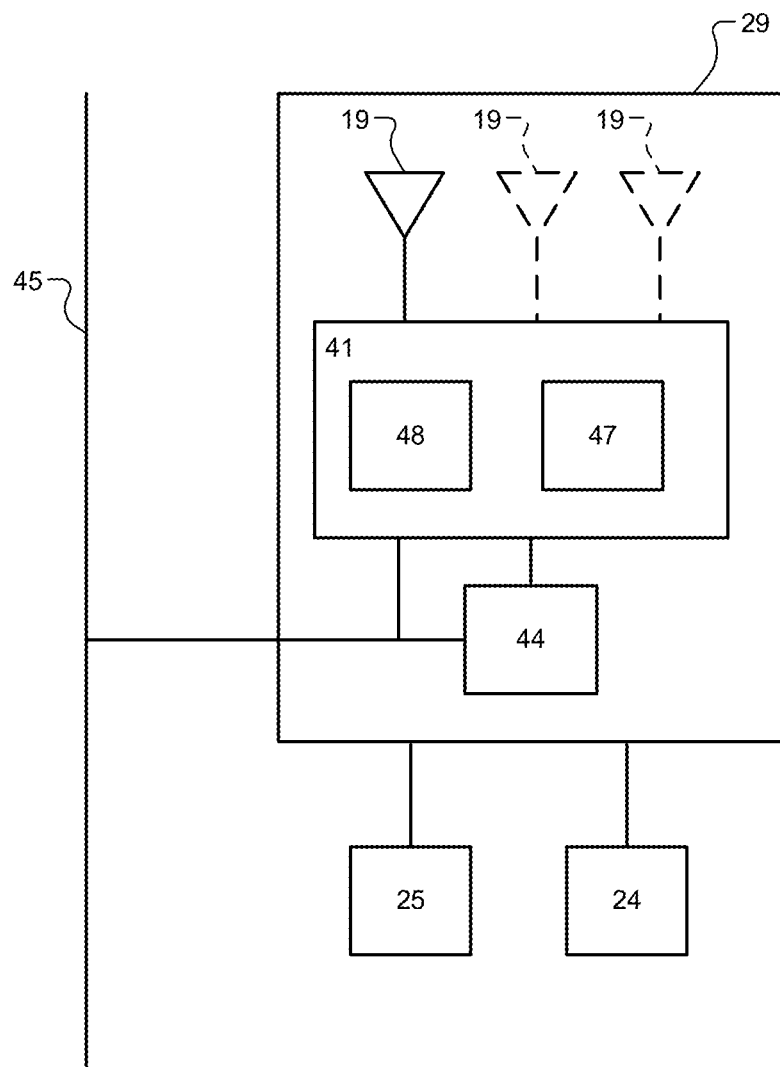
FIG. 4 is a functional block diagram of a communication gateway of a vehicle according to the present disclosure.

With reference to FIG. 4, the communication gateway 29 includes the wireless communication chipset 41 connected to the antennas 19 to receive BLE signals. When the BLE communication protocol is used, the wireless communication chipset 41 implements a Bluetooth protocol stack 48 that is, for example, compliant with the BLE specification (i.e., Bluetooth Specification version 5.0). The wireless communication chipset 41 may also include an application 47 implemented by application code that is executable by a processor of the wireless communication chipset 41. Additionally or alternatively, the application 47 may be executable by a processor of the control module 20 and may be stored in a non-transitory computer-readable medium of the control module 20.

The application 47 may include code corresponding to modifications outside of the Bluetooth specification to enable the wireless communication chipset 41 to inspect timestamped data transmitted and received by the wireless communication chipset 41, regardless of the validity of the data. For example, the application 47 enables the wireless communication chipset 41 to compare transmitted and received data against expectations. The communication gateway 29 is configured to transmit the actual transmitted and received data to the various modules of the control module 20 via the vehicle interface 45. Alternatively, the communication gateway 29 may be configured to receive the data from each of the sensors 31 via the vehicle interface 45. The application 47 may be further configured to enable the wireless communication chipset 41 to confirm that each of the sensors 31 has received the correct data at the correct time.

The Bluetooth protocol stack 48 is configured to provide the channel map, access identifier, next channel, and the time to the next channel to the application 47. The Bluetooth protocol stack 48 is configured to output timing signals for the timestamps of transmission and reception events to the application 47 and/or a digital PIN output of the wireless communication chipset 41. The communication gateway 29 also includes a timing synchronization module 44, which is configured to accept the timing signals and works in conjunction with the vehicle interface 45 to create accurate time stamps of connection information messages and other communications.

With continued reference to FIG. 4, the communication gateway 29 may provide timing information and channel map information to the timing control module 25 and, respectively. The communication gateway 29 may be configured to provide information corresponding to ongoing connections to the connection information distribution module 24 and timing signals to the timing control modules 25 so that the sensors 31 can find and follow, or eavesdrop on, the communication link 50.

Figure 5:
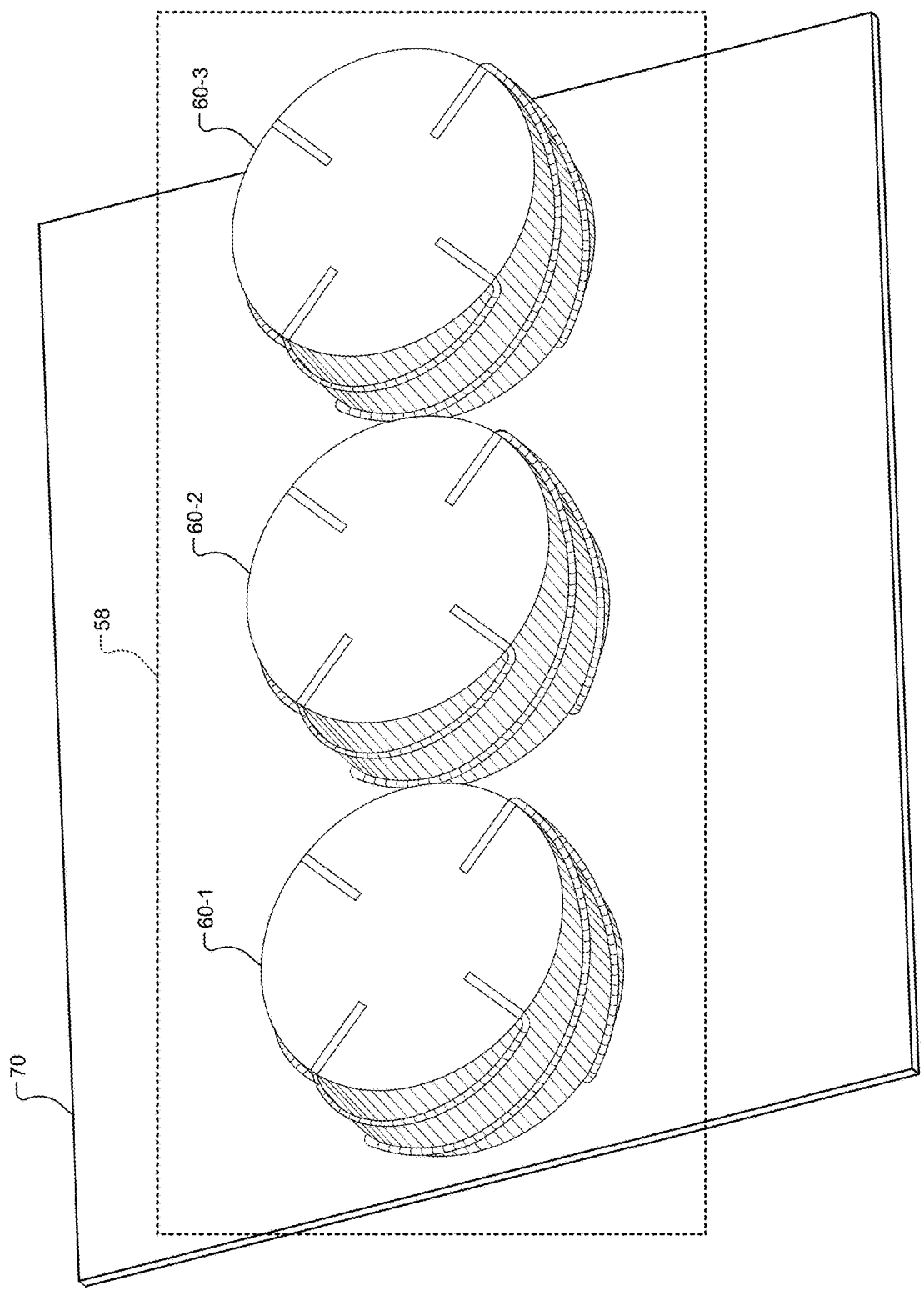
FIG. 5 is an illustration of an example antenna system in accordance with an embodiment of the present disclosure.

With reference to FIG. 5, an example illustration of an antenna system 58 is shown. The antenna system 58 may be configured or programmed to exchange RSSIs, angle-of-departure-transmission values, angle-of-arrival-reception values, round trip time of flight values, and/or carrier phase based ranging information. While this embodiment illustrates three antennas 60, any number of antennas may be included in the antenna system 58. While this embodiment illustrates three antennas 60 arranged linearly, the antennas 60 may be arranged in other configurations, such as in a triangle. Alternatively, two antennas 60 may be arranged. Alternatively, four antennas 60 may be used and may be arranged, for example, linearly or in a diamond configuration. As described below in further detail, the antennas 60 may be capacitively coupled to a ground plane 70 of a printed circuit board (PCB) that has a plurality of layers.

In one embodiment, the antennas 60 are circularly polarized, thereby enabling the PCB or the control module 20 in communication with the PCB to, for example, accurately determine an angle of arrival of the communication link 50 relative to the respective sensor 31. Furthermore, circular polarization enables strong direct links between the portable device 10 and the antennas 60 that have less portable device orientation variation in RSSI, angle of arrival, round trip time of flight distance, and carrier phase based ranging distance measurements.

The antennas 60 may have a large gain pattern in a first direction and a lower gain pattern in each of the remaining directions. Furthermore, the large gain pattern and the lower gain patterns may each be approximately uniform. Additionally, the large gain pattern may be associated with a front lobe and one of the lower gain patterns may be associated with a back lobe, wherein the front lobe and the back lobe are approximately symmetric and have a front-to-back gain ratio that is greater than 1. As an example, the antennas 60 may each have a front lobe with a large and approximately uniform gain value from 90° to −90° passing through 0°, and a back lobe with a smaller and approximately uniform gain value from 90° to −90° passing through 180°. By implementing antennas 60 that have a large front-to-back gain ratio, the antenna system 58 prevents coupling effects of the antennas 60 from affecting the transmit/receive characteristics of the sensors 31. Furthermore, by implementing antennas 60 that have a large front-to-back gain ratio, the antenna system 58 provides a reflection-free environment and, as such, reflections, multipath fading diffraction, refraction, and other sources of amplitude shifting noise sources are either negligible or non-existent.

Furthermore, the antennas 60 may have a large half-power beam width (i.e., 3 dB angular width), thereby enabling the antenna system 58 to accurately receive signals along an edge of the antenna system 58, such as ±90° from bore sight.

The antennas 60 may also be physically coupled to a central location of the ground plane 70. As an example, a center point of each of the antennas 60 may form a first line that is parallel to a second line that includes a center point of the ground plane 70. As such, the control module 20 can accurately determine the angle of arrival of the communication link 50 based on the antenna system 58 being able to provide optimal phase angle difference patterns that are not impacted by the orientation of the portable device 10.

In other embodiments, the antennas 60 may not be physically coupled to the central location of the ground plane 70 (i.e., near the top or bottom of the ground plane 70). Furthermore, while the antennas 60 are shown in a straight line along the center of the ground plane 70, in other embodiments, one or more of the antennas 60 may not be located along the center of the ground plane 70. Additionally, one or more of the antennas 60 may be elevated with respect to the remaining antennas 60 and/or the ground plane 70.

With reference to FIGS. 6A-6B, detailed illustrations of the antenna 60 are shown. The antenna 60 may include a body 80, which includes a top surface 80A, a lateral surface 80B, and a bottom surface 80C (shown in FIGS. 7C and 7D), and antenna elements 90, 92, 94, 96. In some embodiments, the body 80 may include an aperture 100 extending through a middle portion of the body 80, as shown in FIG. 6B. The body 80 may be implemented by a strong electrical insulator, such as a ceramic-infused plastic. The body 80 is described below in further detail with reference to FIGS. 7A-7D.

The antenna elements 90, 92, 94, 96 are configured to receive radio frequency (RF) signals, such as BLE signals, Wi-Fi signals, and/or Wi-Fi direct signals. The antenna elements 90, 92, 94, 96 may include, for example, a copper wire, transmission line, or other similar conductive material. Additionally, the antenna elements 90, 92, 94, 96 are disposed along each surface of the body 80. As described below in further detail with reference to FIGS. 7A-7D and 8, the antenna elements 90, 92, 94, 96 may each be disposed along a respective pathway (e.g., a slot, a structural protrusion, a designated surface, etc.) of the body 80.

Figure 7A:
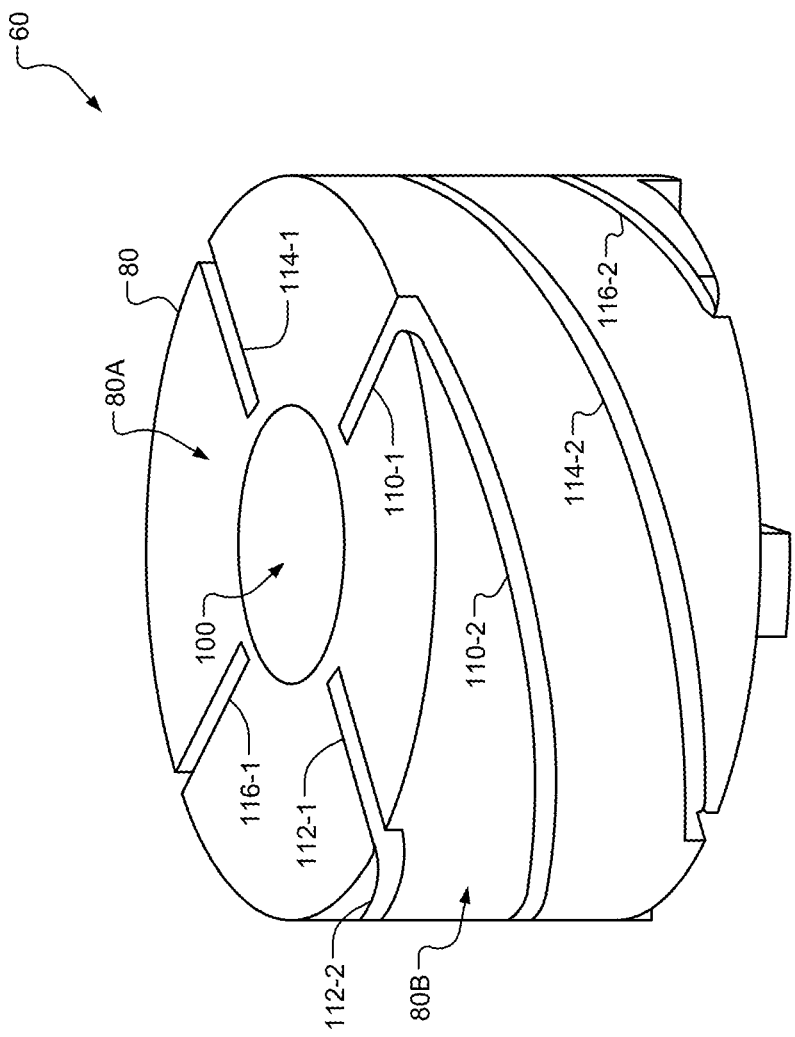
Figure 7B:
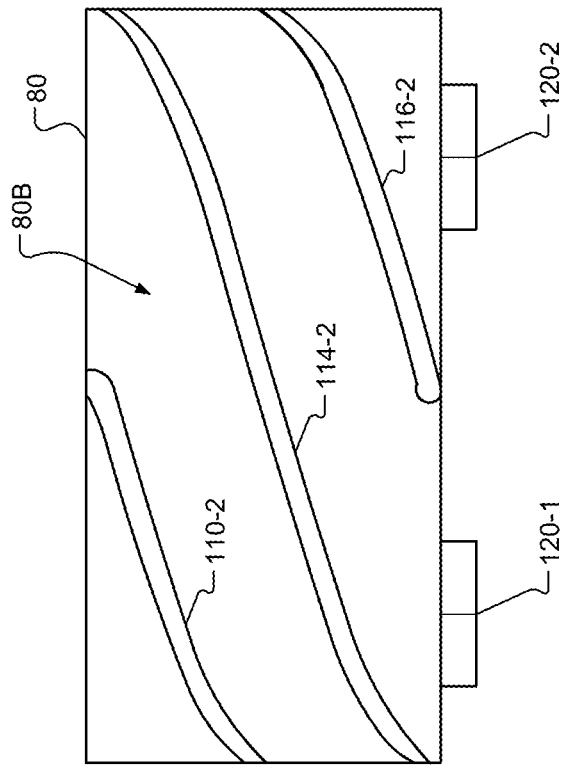

With reference to FIGS. 7A-7B, detailed illustrations of the body 80 are shown. In an embodiment, the body 80 includes pathways 110, 112, 114, 116, which are each configured to receive one of the antenna elements 90, 92, 94, 96. In one embodiment, the pathways 110, 112, 114, 116 may be formed using a milling tool or using a laser engraving process.

Furthermore, pathway 110 includes a first portion 110-1 located on the top surface 80A and a second portion 110-2 located on the lateral surface 80B; pathway 112 includes a first portion 112-1 located on the top surface 80A and a second portion 112-2 located on the lateral surface 80B; pathway 114 includes a first portion 114-1 located on the top surface 80A and a second portion 114-2 located on the lateral surface 80B; and pathway 116 includes a first portion 116-1 located on the top surface 80A and a second portion 116-2 located on the lateral surface 80B. Furthermore, the pathways 110, 112, 114, 116 may form a helical shape along at least one surface of the body 80. Additionally, the body 80 includes mounting elements 120-1, 120-2 that are configured to physically couple the body 80 to the PCB (not shown).

Figure 7D:
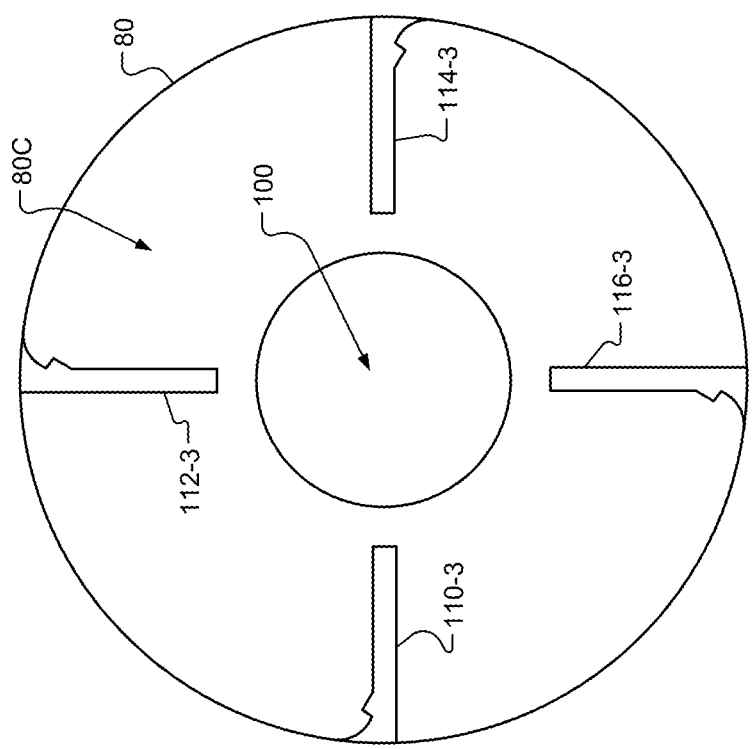

With reference to FIGS. 7C-7D, additional detailed illustrations of the bottom surface 80C of the body 80 are shown. Mounting elements 120-1, 120-2, 120-3, 120-4 (collectively referred to as mounting elements 120) are attached to the bottom surface 80C and, as described above, are configured to physically couple the body 80 to the PCB (not shown). Additionally, pathway 110 includes a third portion 110-3 located on the bottom surface 80C; pathway 112 includes a third portion 112-3 located on the bottom surface 80C; pathway 114 includes a third portion 114-3 located on the bottom surface 80C; and pathway 116 includes a third portion 116-3 located on the bottom surface 80C.

Figure 9:
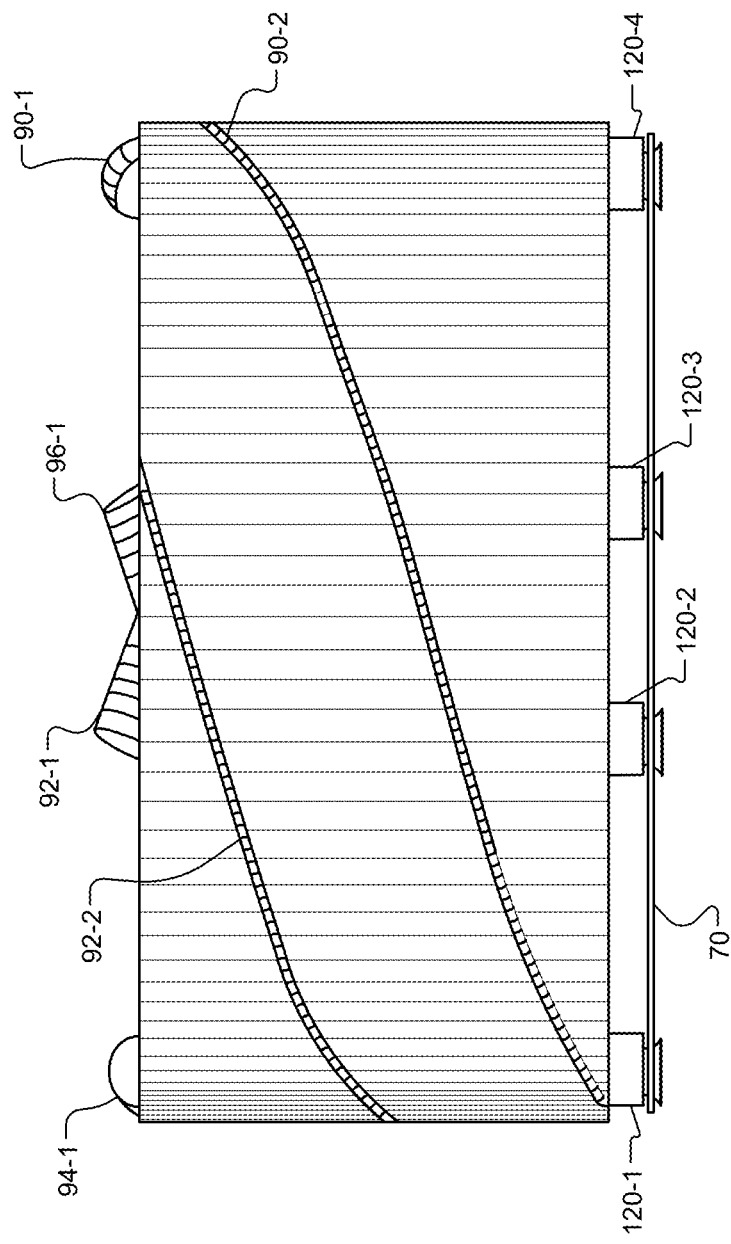

With reference to FIGS. 8-9, detailed illustrations of the antenna elements 90, 92, 94, 96 are shown. Antenna element 90 includes a first portion 90-1, a second portion 90-2, and a third portion 90-3; antenna element 92 includes a first portion 92-1, a second portion 92-2, and a third portion 92-3; antenna element 94 includes a first portion 94-1, a second portion 94-2, and a third portion 94-3; and antenna element 96 includes a first portion 96-1, a second portion 96-2, and a third portion 96-3.

In one embodiment, the first portions 90-1, 92-1, 94-1, 96-1 of the respective antenna elements 90, 92, 94, 96 are disposed in the first portions 110-1, 112-1, 114-1, 116-1 of respective pathways 110, 112, 114, 116. As an example, the first portions 90-1, 92-1, 94-1, 96-1 of the respective antenna elements 90, 92, 94, 96 may be bent such that they are entirely disposed within the first portions 110-1, 112-1, 114-1, 116-1 of respective pathways 110, 112, 114, 116. In other embodiments, the first portions 90-1, 92-1, 94-1, 96-1 of the respective antenna elements 90, 92, 94, 96 may be bent such that they are not entirely disposed within the first portions 110-1, 112-1, 114-1, 116-1 of respective pathways 110, 112, 114, 116, as shown in FIG. 9. The first portions 90-1, 92-1, 94-1, 96-1 of the antenna elements 90, 92, 94, 96 may also be implemented by capacitive top-loaded components that provides a capacitive load, thereby decreasing the size of the antenna 60.

The second portions 90-2, 92-2, 94-2, 96-2 of the respective antenna elements 90, 92, 94, 96 are disposed in the second portions 110-2, 112-2, 114-2, 116-2 of respective pathways 110, 112, 114, 116. As an example, the second portions 90-2, 92-2, 94-2, 96-2 of the respective antenna elements 90, 92, 94, 96 may be entirely disposed within the second portions 110-2, 112-2, 114-2, 116-2 of respective pathways 110, 112, 114, 116.

Figure 10:
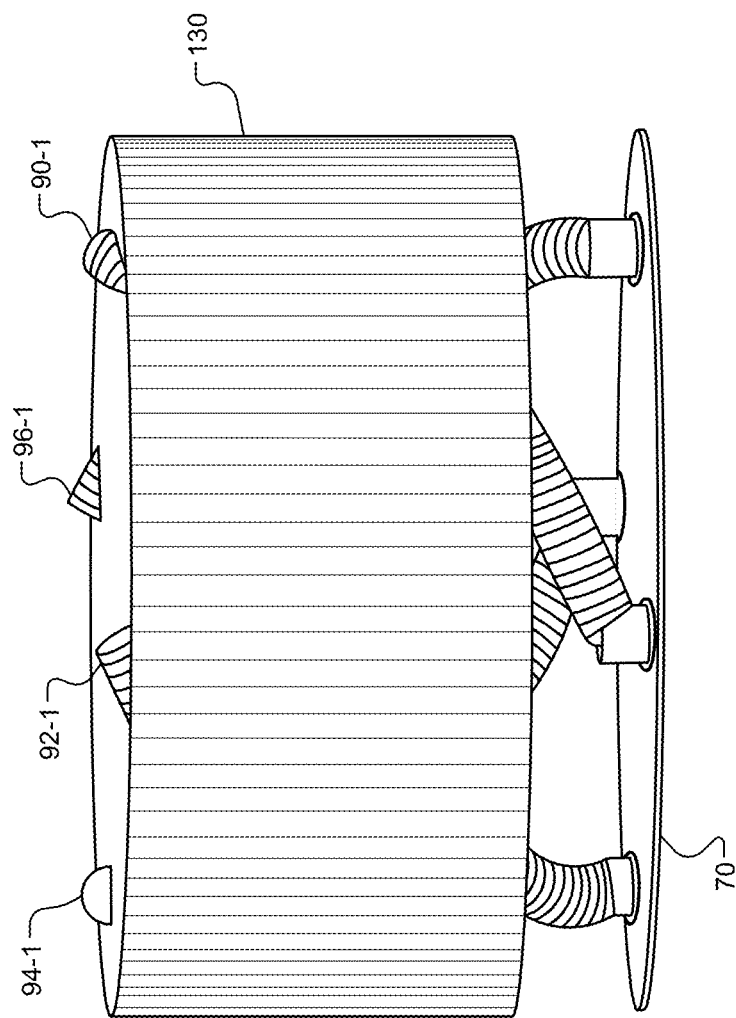
FIGS. 10-12 are illustrations of an encasing element of an antenna in accordance with an embodiment of the present disclosure.

The third portions 90-3, 92-3, 94-3, 96-3 of the respective antenna elements 90, 92, 94, 96 are disposed in the third portions 110-3, 112-3, 114-3, 116-3 of respective pathways 110, 112, 114, 116. As an example, the third portions 90-3, 92-3, 94-3, 96-3 of the respective antenna elements 90, 92, 94, 96 may be bent such that they are entirely disposed within the third portions 110-3, 112-3, 114-3, 116-3 of respective pathways 110, 112, 114, 116. Additionally, the third portions 90-3, 92-3, 94-3, 96-3 of the respective antenna elements 90, 92, 94, 96 may be capacitively coupled to the ground plane 70 via a conductive element, such as copper. In other embodiments, the third portions 90-3, 92-3, 94-3, 96-3 of the respective antenna elements 90, 92, 94, 96 may be bent such that they are not entirely disposed within the third portions 110-3, 112-3, 114-3, 116-3 of respective pathways 110, 112, 114, 116, as shown in FIG. 10.

The third portions 90-3, 92-3, 94-3, 96-3 of the antenna elements 90, 92, 94, 96 may be configured to execute an impedance matching function. As an example, the third portions 90-3, 92-3, 94-3, 96-3 may be implemented by a transmission line having a length associated with a quarter-wavelength of the antenna and a predefined impedance in order to match the impedance of the source (i.e., the first and second portions of the antenna elements 90, 92, 94, 96) to the impedance of the load (i.e., the third portions 90-3, 92-3, 94-3, 96-3 of the antenna elements 90, 92, 94, 96) at a frequency associated with the BLE signals (2.4 GHz).

In other embodiments, the third portions 90-3, 92-3, 94-3, 96-3 may include a transformer that is configured to isolate a balanced source impedance of the first and second portions of the antenna elements 90, 92, 94, 96 with an unbalanced load impedance of the third portions 90-3, 92-3, 94-3, 96-3. Specifically, the third portions 90-3, 92-3, 94-3, 96-3 may each include or be connected to a balun and/or other impedance matching circuit elements that match the impedance of the third portions 90-3, 92-3, 94-3, 96-3 with the impedance of the first and/or second portions of the antenna elements 90, 92, 94, 96.

Additionally or alternatively, the third portions 90-3, 92-3, 94-3, 96-3 may include a filtering circuit for matching the impedances, such as a resistor-inductor-capacitor (RLC) network, an inductor-capacitor (LC) network, and other similar filtering circuits. As a more specific example, the third portions 90-3, 92-3, 94-3, 96-3 may include one of an L-network, a T-network, or a π-network LC circuit. Moreover, the inductors, resistors, and/or capacitors of the filtering circuits may be selected and arranged such that a resonant frequency of the antennas 60 corresponds to the frequency of the BLE signals (2.4 GHz).

With continued reference to FIG. 9, the body 80 and the ground plane 70 may cooperate to define an air gap. The air gap may be configured to decrease the capacitance of the third portions 90-3, 92-3, 94-3, 96-3 of the antenna elements 90, 92, 94, 96. In other embodiments, the mounting elements 120 may be removed and, as such, the body 80 may be substantially flush to the ground plane 70 or other layer of the PCB.

Figure 11:
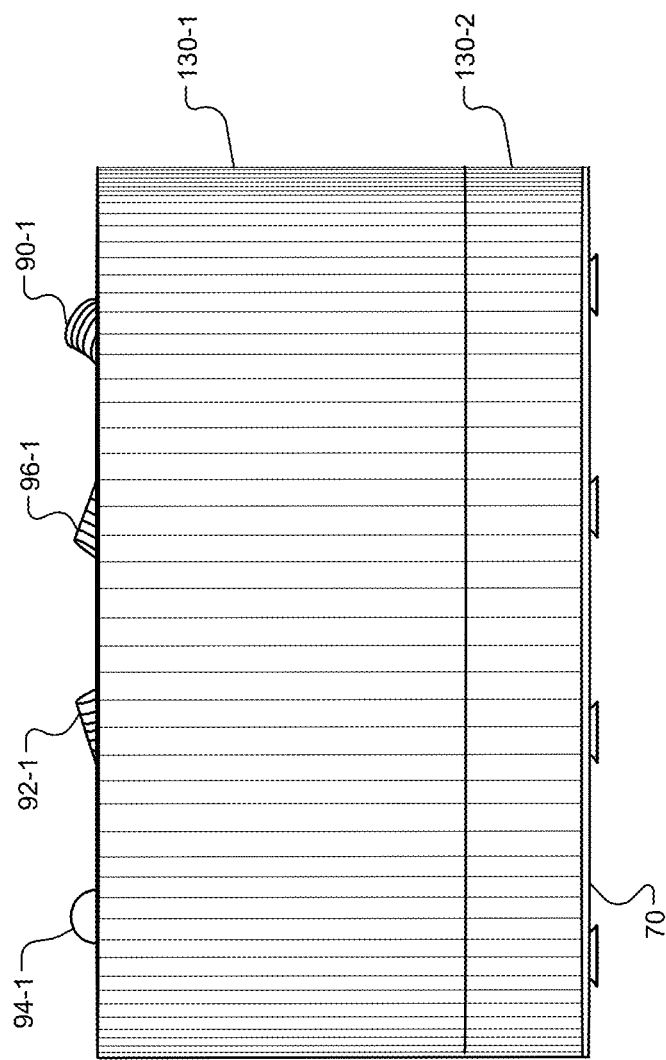
Figure 12:
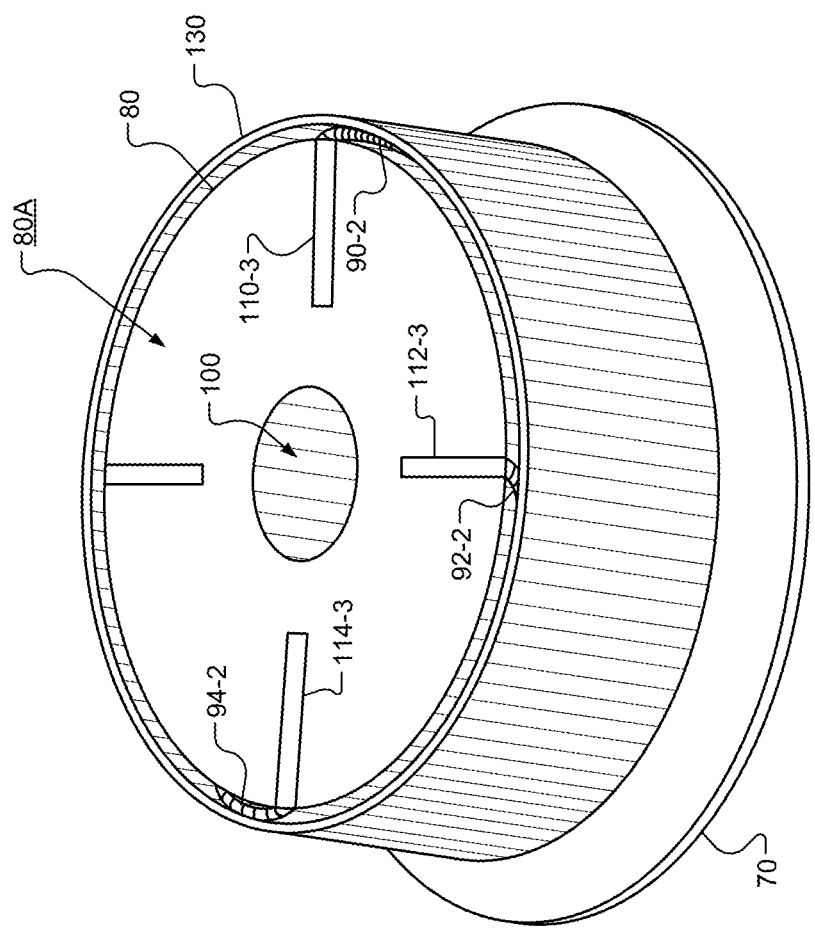

With reference to FIGS. 10-12, example illustrations of encasing element 130 are shown. In one embodiment, the encasing element 130 is physically coupled to the lateral surface 80B of the body 80 and is configured to encase the antenna elements 90, 92, 94, 96, as shown in FIG. 10. In other embodiments, the encasing element 130, which is shown as encasing elements 130-1, 130-2 in FIG. 11, is physically coupled to the lateral surface 80B of the body 80 and is configured to encase both the antenna elements 90, 92, 94, 96 and the air gap between the ground plane 70 and the body 80. In some embodiments, the encasing element 130 and the body 80 may cooperate to define an air gap therebetween, as shown in FIG. 12. As an example, the encasing element 130 may be implemented by a dielectric material having a high dielectric constant (e.g., ε≥10).

Figure 13:
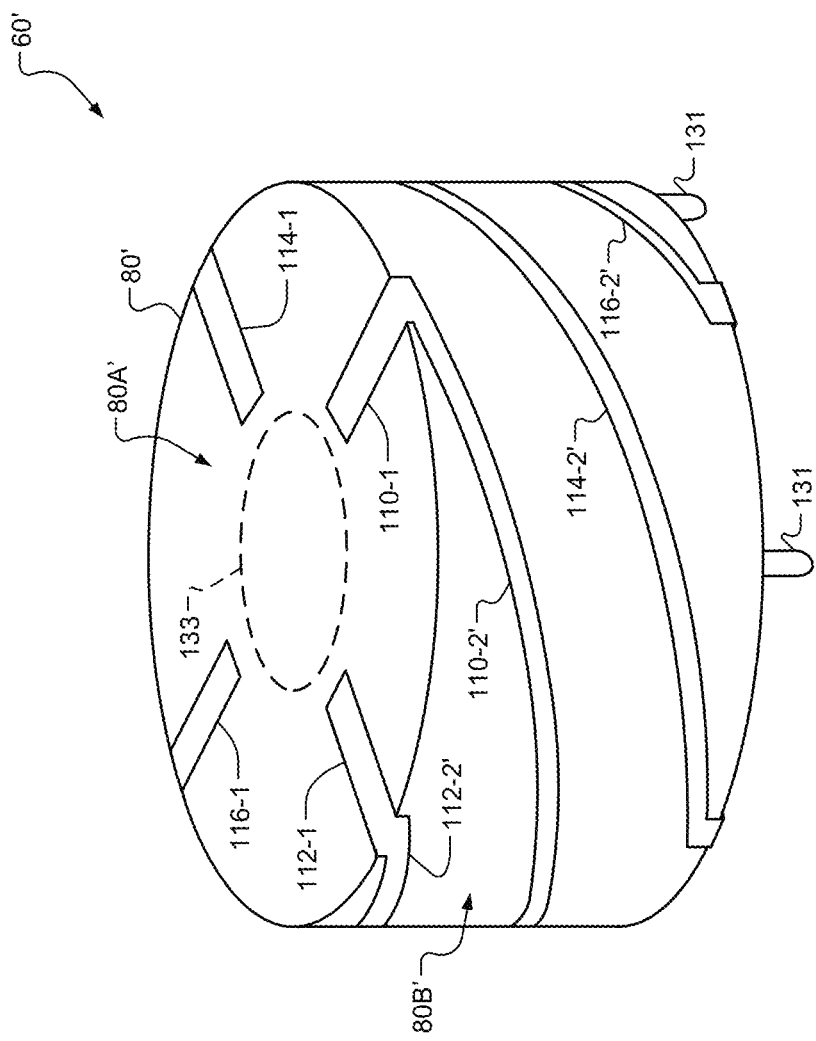
FIGS. 13 and 14 are illustrations of an antenna in accordance with an embodiment of the present disclosure.
Figure 14:
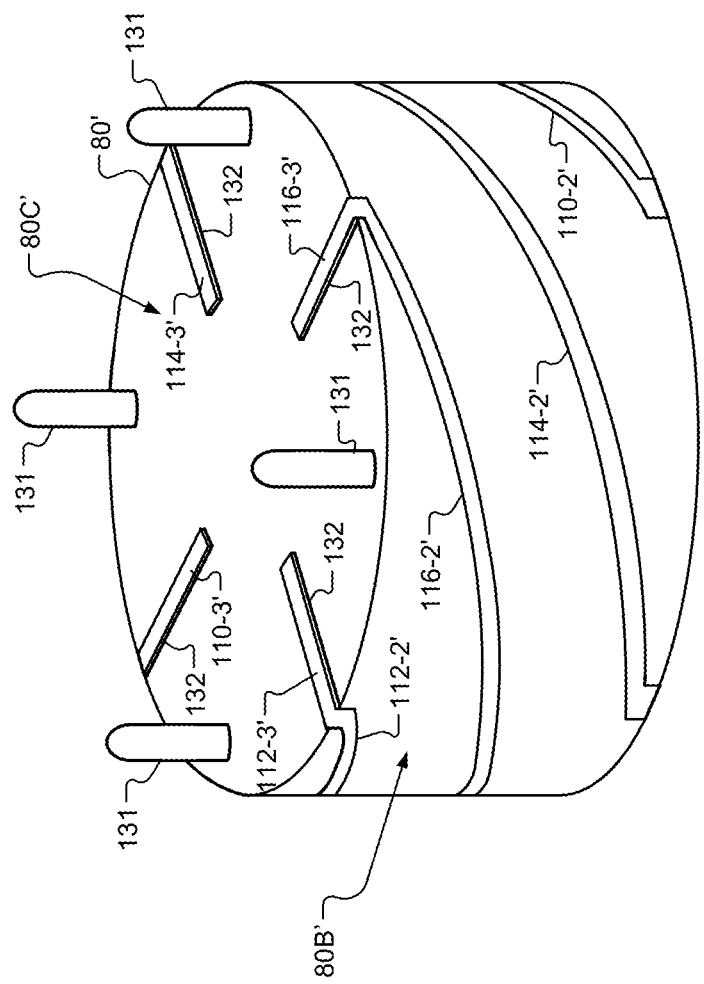

With reference to FIGS. 13-14, an antenna 60' is shown including an antenna body 80' that includes a top surface 80A', a lateral side surface 80B' and a bottom surface 80C'. The antenna 60' is similar to the antenna 60 of FIGS. 7A-7C, but does not include slots, includes heat stakes 131, and antenna element supporting protrusions 132. The protrusions 132 may be integrally formed as part of the antenna body 80'. The antenna body 80' may include a centrally located recessed notch (or indentation) 133. In one embodiment, a centrally located hole (e.g., a counter sunk hole) is provided instead of the recessed notch 133. The recessed notch 133 may be centered on the top surface 80A' or bottom surface 80C' to minimize signal disturbance. The recessed notch 133 may be positioned, sized and shaped for maximum RF performance and may be an artifact of a gate in an injection molding process of the antenna body 80'. The heat stakes 131 may be formed of injection molded plastic.

The antennas include antenna elements 110-1', 112-1', 114-1', 116-1', 110-2', 112-2', 114-2', 116-2', 110-3', 112-3', 114-3', 116-3', which are on corresponding sides 80A'-80C'. The antenna elements 110-1', 112-1', 114-1', 116-1', 110-2', 112-2', 114-2', 116-2', 110-3', 112-3', 114-3', 116-3' may be surface deposited traces (or electrodes). The thickness of the protrusions 132 are used to adjust distances between the antenna elements 110-3', 112-3', 114-3', 116-3' and a ground plane in a corresponding printed circuit board. These distances may be adjusted to adjust parasitic capacitance between the antenna elements and the ground plane and to tune RF frequencies transmitted by the antenna 60'.

Figure 15:
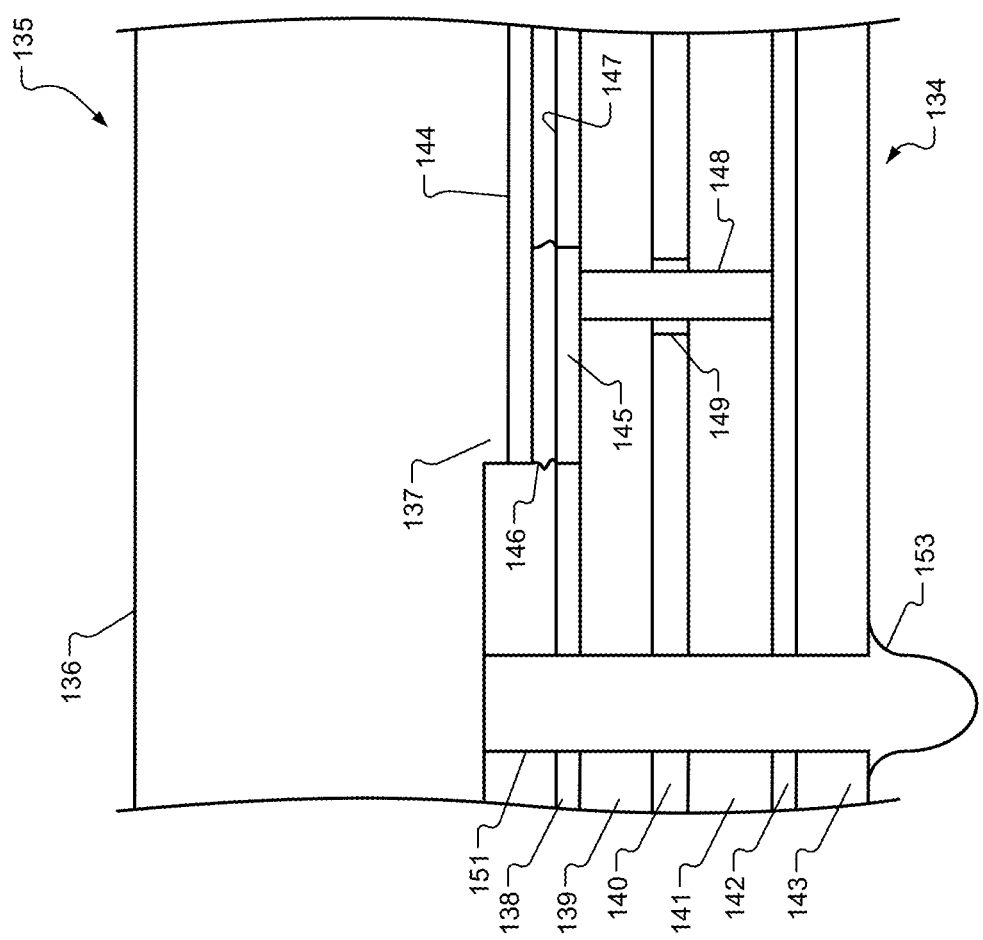
FIG. 15 illustrates a portion of a printed circuit board including a portion of an antenna mounted on the printed circuit board in accordance with an embodiment of the present disclosure.

FIG. 15 shows an example of a portion 134 of a printed circuit board and a portion 135 of an antenna having an antenna body 136. The antenna body 136 includes antenna element supporting protrusions (e.g., the antenna element supporting protrusion 137), similar to the antenna element supporting protrusions 132 of FIG. 14. The printed circuit board 134 includes multiple layers including a first dielectric layer 138, a second dielectric layer 139, a ground plane layer 140, a third dielectric layer 141, a conductive layer 142, and a base layer 143. The base layer 143 may include multiple layers. This stack up of layers is provided as an example, the layers may be stacked differently and one or more intermediate layers may be disposed between each adjacent pair of layers shown.

An antenna element 144 is disposed on a bottom surface of the antenna element support protrusion 132 and is in contact with a conductive pad 145 via, for example, a conductive paste 146. The conductive pad may be flush with a top surface 147 of the printed circuit board as shown or may be surface mounted on the top surface 147. The conductive pad 145 is connected to the conductive layer 142 via an interconnecting element 148, which extends through an opening 149 of the ground plane layer 140. A parasitic capacitance exists between the antenna element 144 and the ground plane layer 140. This may be the case for other antenna elements mounted on antenna element supporting protrusions of the antenna body 136.

The antenna body 136 includes heat stakes (one heat stake 151 is shown). The heat stakes extend through respective holes in the printed circuit board. Bottom ends of the heat stakes are heated and melted (one melted end 153 of the heat state 152 is shown) to lock the heat stake to the printed circuit board.

Figure 16A:
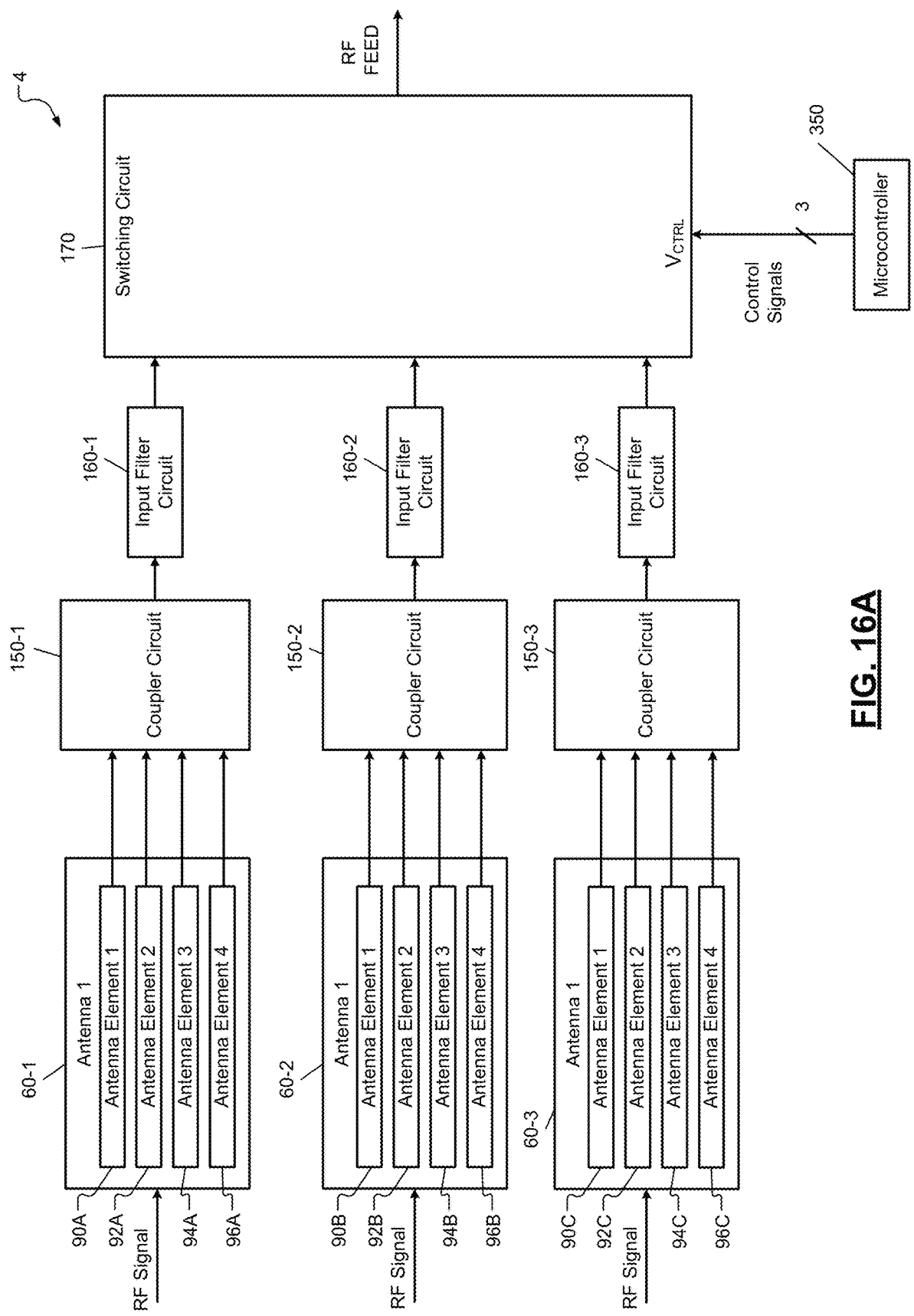
FIGS. 16A-16B is an illustration of another example angle of arrival measurement system in accordance with an embodiment of the present disclosure.
Figure 16B:
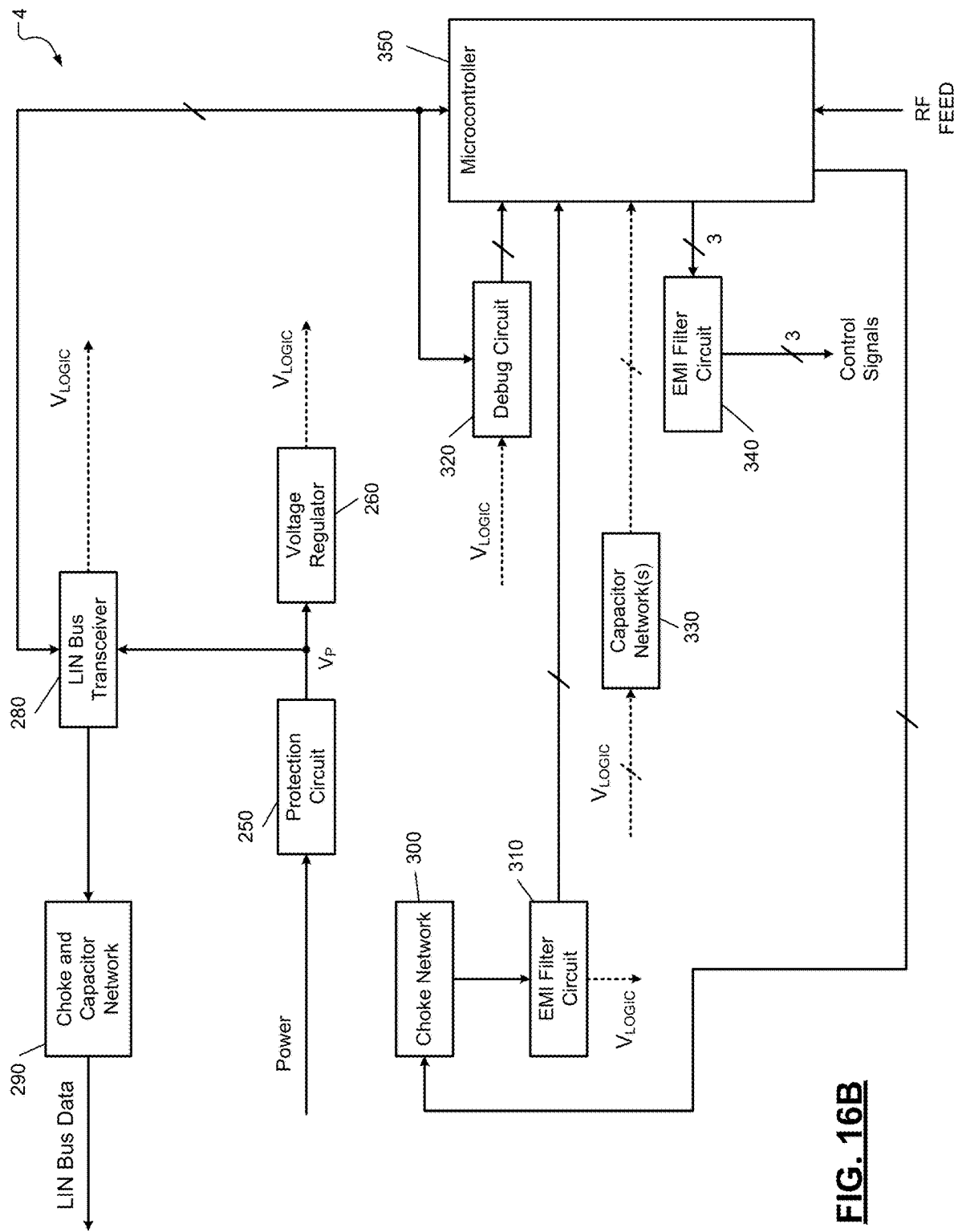

FIGS. 16A and 16B (collectively FIG. 16) show an example electronics system 4 is configured to determine an angle of arrival of the communication link 50 of FIG. 2. The electronics system 4 may include, for example, the antennas 60 or 60' and corresponding antenna elements 90A-C, 92A-C, 94A-C, 96A-C, coupler circuits 150-1, 150-2, 150-3 (collectively referred to as coupler circuits 150), input filter circuits 160-1, 160-2, 160-3 (collectively referred to as input filter circuits 160), and a switching circuit 170. In one embodiment, the coupler circuits 150, the input filter circuits 160, and the switching circuit 170 may be disposed on a PCB.

As described above, each of the antennas 60 or 60' is configured to receive, at various phases (0°, 90°, 180°, and 270°, or 0°, −90°, −180°, and −270°), the RF signal transmitted by the portable device 10. The antenna elements of each of the antennas respectively receive signals at the different phases. As an example, antenna elements 90A, 92A, 94A, 96A may receive a RF signal at respective phases 0°, −90°, −180°, and −270°. This system 4 may include one or more (n) antenna elements per antenna and the coupler circuits 150 have phase inputs at steps of 360°/n. The sign of phase and the definition of positive and negative phase and the right versus left handedness may be such that the antennas 60, 60' have greater gain towards the top surfaces of the antennas and smaller gain towards the bottom surfaces of the antennas.

In one embodiment, pairs of the antenna elements are connected to respective baluns and/or other impedance matching circuit elements, where each balun has two outputs; one output connected to the ground plane and the other output connected to a corresponding one of the coupler circuits 150. Thus, each of the antennas 60, 60' may be connected to two baluns, where the two baluns have two outputs that are connected to the same coupler circuit. The coupler circuits 150, which may be implemented by a 3 dB 90° hybrid coupler. The coupler circuits 150 may include hybrid devices, such as hybrid couplers and/or hybrid splitters/combiners, such as quadrature (90-degree) and 180-degree hybrids in coaxial connectorized and surface-mount packages. In one embodiment, the coupler circuits 150 include respective impedance matching circuits.

Each of the coupler circuits 150 are configured to combine the RF signals received from the corresponding antenna elements and output a signal that has a phase difference of, for example, 90°. Reflections from signal mismatches may be provided to the ground plane via an isolation port of the coupler circuits 150.

The coupler circuits 150 are configured to provide the signals to the switching circuit 170 via the input filter circuits 160, which may be configured to reject unwanted signals from out-of-band frequency ranges associated with the antennas 60, 60'. In one embodiment, the input filter circuits 160 may be implemented by one or more decoupling capacitors. In one embodiment, the coupler circuits 150 receive an input signal from each antenna element, phase shift the input signals by multiples of 360°/n, where n is the number of elements and additively combine the corresponding resultant radio frequency signals into a single output signals, which are provided to the input filter circuits 160.

In response to receiving the signals from each of the coupler circuits 150, the switching circuit 170 is configured to selectively output one of the signals. As an example, in response to providing a control signal ($V_{CTRL}$) to a first control port of the switching circuit 170, the switching circuit 170 is configured to output the signal associated with antenna 60-1 to the control module 20. In response to providing the control signal to a second control port of the switching circuit 170, the switching circuit 170 is configured to output the signal associated with antenna 60-2 to the control module 20. Likewise, in response to providing the control signal to both the first and second control ports of the switching circuit 170, the switching circuit 170 is configured to output the signal associated with antenna 60-3 to the control module 20. In order to provide the control signals to the control ports of the switching circuit 170, a 2:3 transistor-transistor logic/complementary metal-oxide-semiconductor (2:3 TTL/CMOS) compatible decoder of the switching circuit 170 is configured to selectively activate two control ports of the switching circuit 170 that are electrically coupled to a control voltage generator circuit 220. The transceiver 21 may be a superheterodyne style receiver. The microprocessor configures the transceiver 21 and switches, such that the antennas 60, 60' receive a RF signal that is close to the phase lock loop (PLL), e.g., PLL+250 KHz In response to the control module 20 receiving one of the signals and sends the signal through an amplifier, a 0 degree (in-phase (I)) and 90 degree (quadrature-phase (Q)) mixer, a low pass filter, an in-phase and quadrature-phase analog-to-digital (ADC), and processing circuitry to down convert the intermediate frequency signal to a 0 Hz signal, where the processor receives IQ values of a +250 KHz sine wave.

The control module 20 is configured to determine a phase angle of the 0 Hz IF IQ signals the respective one of the antennas 60, 60' and at least one phase angle difference between the 0 Hz IF IQ signals of at least one pair of the antenna system 58. The phase angle refers to an angle between in-phase and quadrature-phase components of one of the signals received by the respective one of the antennas 60, 60' in the antenna system.

In order to determine the phase angle of the 0 Hz IF IQ signals and the at least one phase angle difference, the control module 20 may include one or more processors that are configured to execute instructions in a non-transitory computer readable memory, such as a RAM and/or ROM. Moreover, the control module 20 may be configured to determine the angle of arrival based on the at least one phase difference. The coupler circuits 150, the input filter circuits 160, and the switching circuit 170 may be disposed on the PCB.

The electronics system 4 generates the control signals ($V_{CTRL}$) using a corresponding circuit topology and includes a microcontroller 350 that is configured to determine a phase angle of the 0 Hz IF IQ signals of the respective one of the antennas 60, 60' and at least one phase angle difference of the antenna system 58. In order to determine the phase angle of the 0 Hz IF IQ signals and the at least one phase angle difference, the microcontroller 350 may include one or more processors that are configured to execute instructions in a non-transitory computer readable memory, such as RAM and/or ROM. The instructions may include, for example, algorithms for converting the signals received from the switching circuit 170 (RF FEED) into a phase angle of the 0 Hz IF IQ signals and subsequently determining the at least one phase angle difference.

The electronics system 4 may also be configured to convert power received from a power source (e.g., a DC power source that outputs 12V) to a voltage level suitable for the microcontroller 350. In one embodiment, a protection circuit 250 receives power from the power source, and the protection circuit 250 is configured to suppress high frequency signals and noise. As an example, the protection circuit 250 may include a ferrite bead and bypass capacitor filter circuit.

A voltage regulator 260 receives a filtered power signal ($V_P$), which has a voltage value that is equal to the voltage value of the power supply, from the protection circuit 250. The voltage regulator 260 converts the filtered power signal to a second logic signal ($V_{LOGIC}$) having a voltage value suitable for the microcontroller 350, such as 3.3 Volts. The voltage regulator 260 may be implemented by, for example, a voltage regulator IC or a buck converter circuit.

A LIN bus transceiver 280 may be configured to receive phase angle measurements from the microcontroller 350 and transmit them to the control module 20 via the LIN bus and choke and capacitor network 290. Additionally or alternatively, the LIN bus transceiver 280 may be configured to receive the at least one phase angle difference or at least one angle of arrival measurement(s) from the microcontroller 350 and transmit them to the control module 20 via the LIN bus and the choke and capacitor network 290. As an example, the choke and capacitor network 290 may include at least one ferrite bead and bypass capacitor filter and a Zener diode electrically coupled in parallel to the at least one ferrite bead and bypass capacitor filters. Additionally, the LIN bus transceiver 280 receives the filtered power signal from the protection circuit 250, and the LIN bus transceiver 280 may include a voltage regulator IC that converts the filtered power signal to the second logic signal ($V_{LOGIC}$).

A choke network 300 and an electromagnetic interference (EMI) filter circuit 310 are configured to suppress noise present in signals received from and/or transmitted to the microcontroller 350. The choke network 300 may be implemented by, for example, a plurality of ferrite beads. The EMI filter circuit 310 may be implemented by, for example, an integrated circuit that includes an EMI filter array.

A debug circuit 320 is configured to enable an operator to test the functionality of the various circuits of the PCB, such as the microcontroller 350. Additionally, the operator may update and/or load software of the microcontroller 350 via the debug circuit 320. The debug circuit 320 may include various interfaces for enabling the operator to test the functionality or update the software of the microcontroller 350, such as a joint test action group (JTAG) standard interface or a serial wire debug (SWD) standard interface.

The microcontroller 350 may be configured to receive the logic signal ($V_{LOGIC}$) at various ports of the microcontroller 350 via at least one capacitor network 330, which may be configured to prevent noise of the logic signal from damaging the microcontroller 350.

In some embodiments, the microcontroller 350 may include a Bluetooth transceiver circuit that enables the microcontroller 350 to communicate with peripheral devices via a Bluetooth communication link.

The microcontroller 350 may be configured to provide control signals to the switching circuit 170 via EMI filter circuit 340, which may be implemented by, for example, an integrated circuit that includes an EMI filter array. In response to receiving one of the control signals, the switching circuit 170 is configured to selectively output one of the signals received via the coupler circuits 150, as described above. As an example, in response to a first control signal being provided to the switching circuit 170, the switching circuit 170 is configured to output the signal associated with antenna 60-1 to the microcontroller 350. In response to a second control signal being provided to the switching circuit 170, the switching circuit 170 is configured to output the signal associated with antenna 60-2 to the microcontroller 350. Likewise, in response to a third control signal being provided to the switching circuit 170, the switching circuit 170 the switching circuit 170 is configured to output the signal associated with antenna 60-3 to the microcontroller 350.

In response to the microcontroller 350 receiving one of the signals, the microcontroller 350 is configured to determine a phase angle of the 0 Hz IF IQ signals of the corresponding antenna 60 or 60' and at least one phase angle difference of the antenna system 58. Moreover, the microcontroller 350 may be configured to determine the angle of arrival based on the at least one phase difference.

Figure 17:
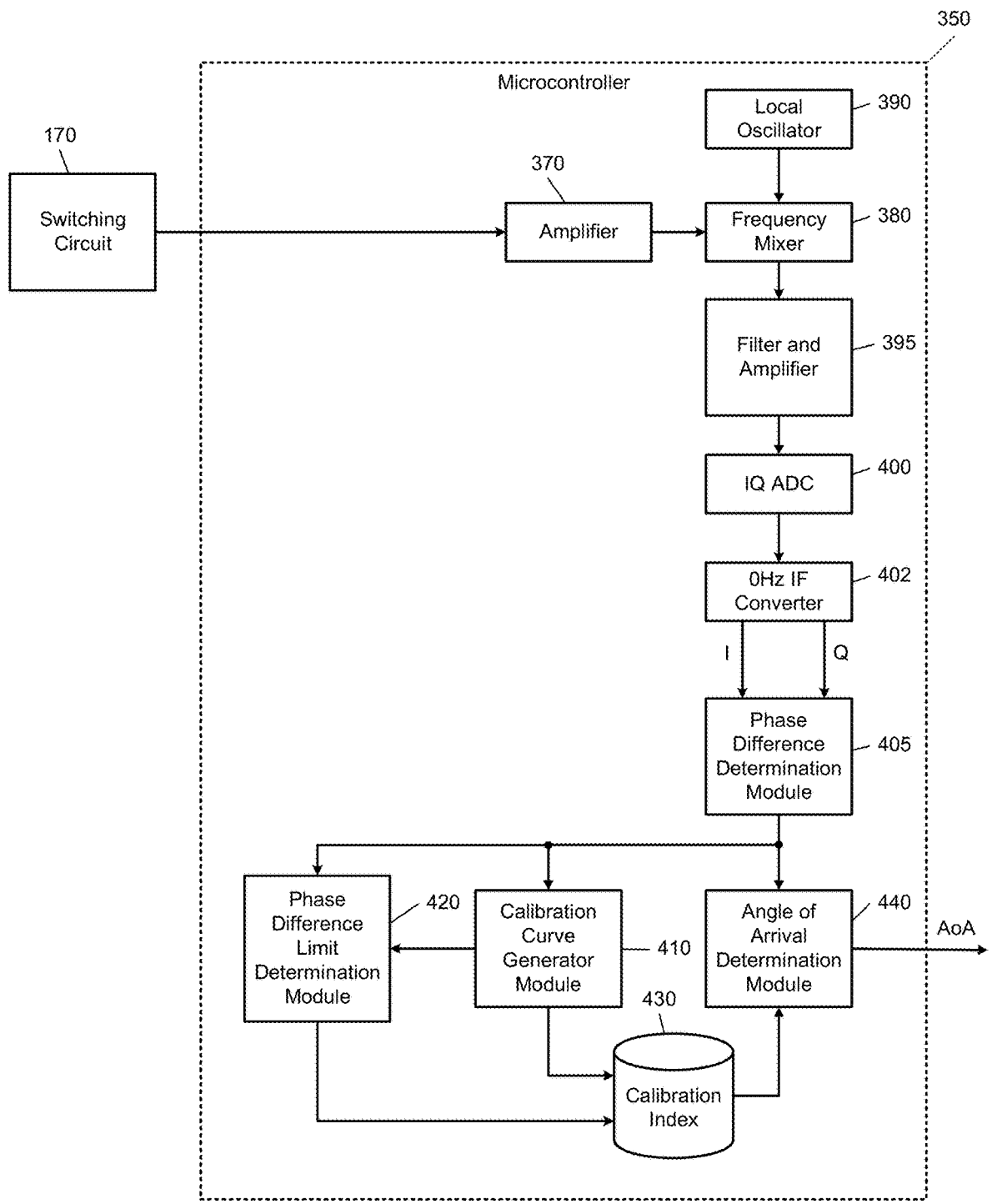
FIG. 17 is a functional block diagram of an example microcontroller in accordance with an embodiment of the present disclosure.
Figure 25:
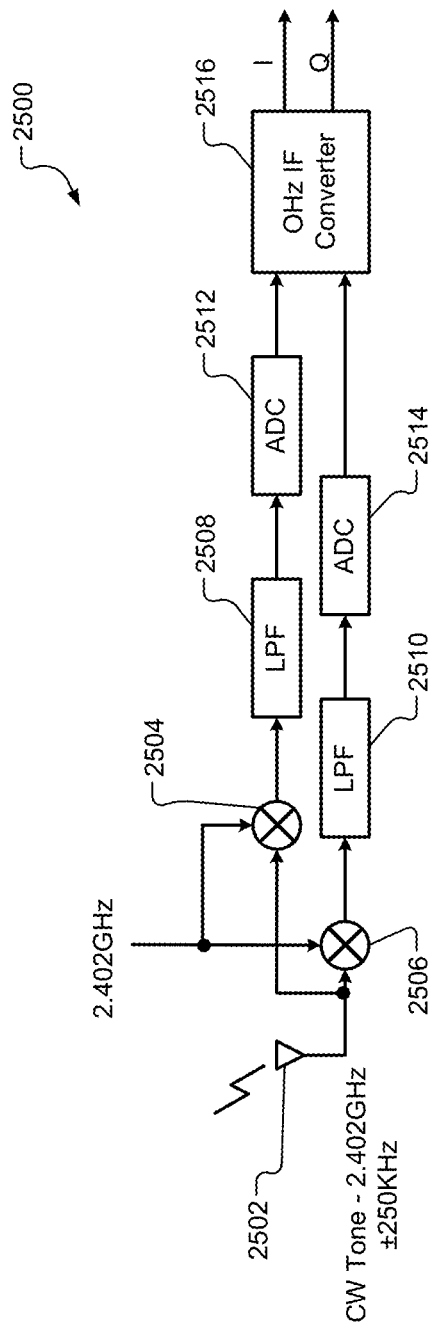
FIG. 25 is a functional block diagram of an example receiving circuit for determining a phase angle between in-phase and quadrature components of a radio frequency signal in accordance with an embodiment of the present disclosure.

With reference to FIG. 17, an example functional block diagram of the microcontroller 350 is shown. As described below in further detail, the microcontroller 350 is configured to determine an angle of arrival of the antenna system 58 based on one of the signals selectively outputted by the switching circuit 170. In one embodiment, the microcontroller 350 may include an amplifier 370, a frequency mixer 380, a local oscillator 390, a filter and amplifier 395, an IQ ADC 400, a 0 Hz intermediate frequency (IF) converter 402, a phase difference determination module 405, a calibration curve generator module 410, a phase angle difference limit determination module 420, a calibration index 430, and an angle of arrival determination module 440. The IQ ADC 400, the 0 Hz IF converter 402, the phase difference determination module 405, the calibration curve generator module 410, the phase angle difference limit determination module 420, and the angle of arrival determination module 440 may be implemented by one or more processors that are configured to execute instructions stored in a non-transitory computer readable medium, such as a RAM and/or ROM. An example of devices 380, 395, 400 and 402 is shown in FIG. 25 and further described below.

The amplifier 370 is configured to amplify the signals and may be implemented by, for example, an operational amplifier. The frequency mixer 380 is configured to receive the amplified signal from the amplifier 370 and a mixing signal from the local oscillator 390 in order to change the amplified signal into a new, intermediate signal. The filter and amplifier 395 may be configured to generate an analytic signal by amplifying the intermediate signal and limiting the frequencies of the intermediate signal to a certain bandwidth. In one embodiment, the filter and amplifier 395 are implemented by an operational amplifier and either a bandpass filter or a low pass filter. In another embodiment, the filter and amplifier 395 pass an intermediate frequency or set of frequencies when implemented as a bandpass filter. The filter and amplifier 395 may pass a low frequency or set of frequencies when implemented as a low pass filter.

As an example, the frequency mixer 380 receives the amplified signal, which has a frequency of, for example, 2.4 GHz-2.4835 GHz. The frequency mixer 380 receives the mixing signal from the local oscillator 390, which may be implemented by a phase-locked loop circuit, and mixes the amplified signal and the mixing signal in order to generate the intermediate signal. Subsequently, the filter and amplifier 395 may generate the analytic signal by amplifying the intermediate signal and limiting the frequencies of the intermediate signal to a certain bandwidth, such as 250 kHz.

The IQ ADC 400 is configured to convert the intermediate signal from an analog signal to a digital analytic signal. The 0 Hz IF converter 402 is configured to obtain a cosine component (i.e., in-phase component) and a sine component (i.e., quadrature-phase component) of the digital analytic signal. Subsequently, a phase angle difference determination module 405 is configured to determine a phase angle of the 0 Hz IF IQ signals of an antenna 60 (or 60') based on the cosine component (I or in-phase component) and the sine component (Q or quadrature-phase component). As a specific example, the phase angle difference determination module 405 may determine the phase angle by executing an arctangent function of an amplitude of the sine component and an amplitude of the cosine component. Furthermore, the phase angle difference determination module 405 may be configured to determine the phase angle difference between a pair of antennas 60 of the antenna system 58 based on the phase angle of each antenna of the pair of antennas 60. Determining the phase angle and the phase angle difference are described below in further detail with reference to FIGS. 18-19.

The phase difference determination module 405 is configured to determine the phase angle difference value between a pair of antennas 60 of the antenna system 58 (e.g., the phase angle difference value between an outer pair of antennas, such as antennas 60-1 and 60-3) for various locations of the portable device 10. As an example, the phase angle difference determination module 405 is configured to determine the phase angle difference between the pair of antennas 60 for each azimuth angle (i.e., 0°-360°) between the antenna system 58 and the portable device 10.

Additionally, the phase angle difference determination module 405 is configured to determine the phase angle difference value between a pair of antennas 60 (or 60') of the antenna system 58 for various communication channels of the portable device 10. As an example, the phase angle difference determination module 405 is configured to determine the phase angle difference between the pair of antennas 60 for each BLE communication channel.

The calibration curve generator module 410 is configured to generate a plurality of reference curves based on the information obtained by the phase difference determination module 405. As an example, the calibration curve generator 410 may be configured to generate a first reference curve associated with a first BLE communication channel, and the first reference curve may represent a measured phase angle difference of a pair of antennas 60 for each azimuth angle. Moreover, the calibration curve generator 410 may generate a reference curve for each BLE communication channel, wherein each of the additional reference curves represent a measured phase angle difference value of a pair of antennas 60 for each azimuth angle. Additionally, the calibration curve generator module 410 is configured to generate a calibration curve based on the first reference curve and at least one of the additional reference curves. Generating the reference curves and the calibration curve are described below in further detail with reference to FIGS. 18-19.

The phase difference limit determination module 420 is configured to generate a phase angle difference limit for each communication channel. As an example, the phase angle difference limits may be associated with a predefined distance from the bore sight of the antenna system 58 (e.g., phase angle difference value limits for a particular communication channel are defined as phase angle difference value on calibration curve at ±80° from bore sight). As another example, the phase angle difference limits may be determined based on the geometry of the reference curve for a particular communication channel. More specifically, the phase angle difference limits may be associated with a location on the reference curve in which the derivative of the reference curve changes by a predefined amount. The phase angle difference limit may be the same for each communication channel. In other embodiments, each communication channel may have different phase angle difference limits.

The calibration curve generator module 410 and the phase angle difference limit determination module 420 are configured to store the calibrated curve and the phase angle difference limits, respectively, in the calibration index 430. Using the calibration index 430 and the antenna pair phase angle differences, the angle of arrival determination module 440 is configured to determine the location of the portable device 10 by referencing the calibration curve and/or the phase angle difference limit of the respective channel. Using the phase angle difference and the communication channel, the respective angle of arrival determination modules 440 may reference the calibration curve and/or the phase angle difference limit associated with the first communication channel and determine the azimuth angle between the portable device 10 and the respective antenna 43. Using each of the azimuth angles obtained by each of the antennas 43, the control module 20 may be configured to determine the location of the portable device 10 relative to the vehicle 30.

Figure 18:
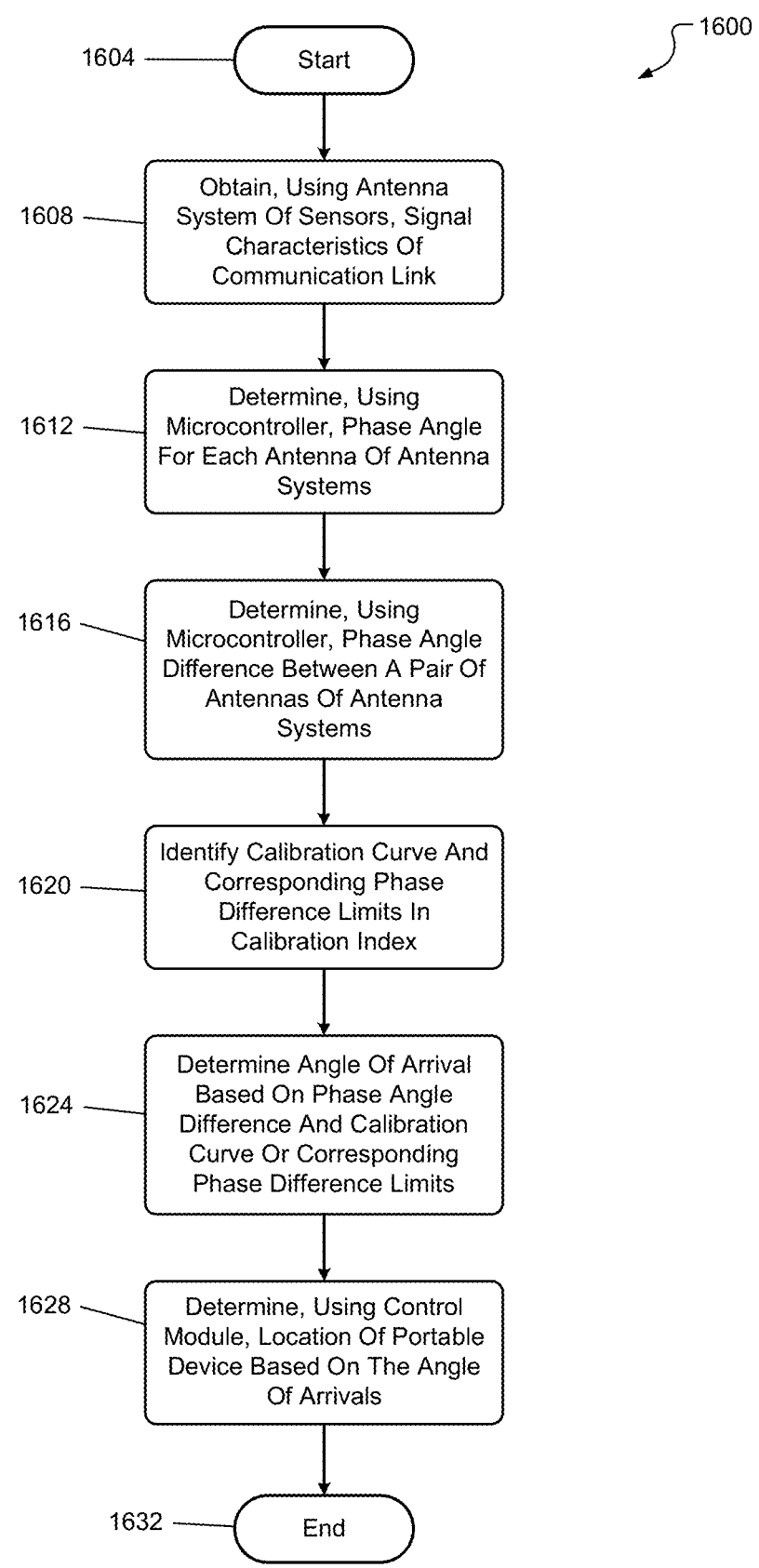
FIGS. 18-20 are flowcharts of example control algorithms in accordance with an embodiment of the present disclosure.

With reference to FIG. 18, a flowchart of a control algorithm 1600 for determining an angle of arrival of the communication link 50 and the location of the portable device 10 is shown. The control algorithm 1600 begins at 1604 when, for example, the portable device 10 is connected to and authorized to connect to the communication gateway 29. At 1608, the control algorithm 1600 obtains, using the antenna systems 58 of the sensors 31, signal characteristics of the communication link 50. At 1612, the control algorithm 1600 determines, using the microcontroller 350, a phase angle for each antenna 60 (or 60') of the antenna systems 58. At 1616, the control algorithm 1600 determines, using the microcontroller 350, a phase angle difference between a pair of antennas 60 of the antenna system 58. At 1620, the control algorithm 1600 identifies, using the microcontroller 350, the calibration curve and corresponding phase angle difference limits in the calibration index 410. As described above, the microcontroller 350 may identify the phase angle difference limits based on the communication channel or frequency of the communication link 50.

At 1624, the control algorithm 1600 determines, using the microcontroller 350, an angle of arrival of the portable device 10 based on (i) the determined phase angle difference and (ii) the calibration curve or corresponding phase angle difference limits. As an example, the microcontroller 350 may determine the angle of arrival by identifying an azimuth angle on the calibration curve that is associated with the determined phase angle difference. Alternatively, the microcontroller 350 may determine the angle of arrival by identifying an azimuth angle on the calibration curve associated with the phase angle difference limits that is associated with the determined phase angle difference and the communication channel of the communication link 50. The angle of arrival is based on, equal to and/or directly related to the azimuth angles determined. At 1628, the control algorithm 1600 determines, using the control module 20, the location of the portable device 10 relative to the vehicle 30 based on each of the angle of arrivals obtained by the sensors 31. At 1632, the control algorithm 1600 ends.

The control module 20 may, based on or in response to determined location of the portable device 10, unlock a vehicle door, provide access to a vehicle (e.g., the vehicle 30), open a window, permit starting of a vehicle, and/or perform some other task.

Figure 19:
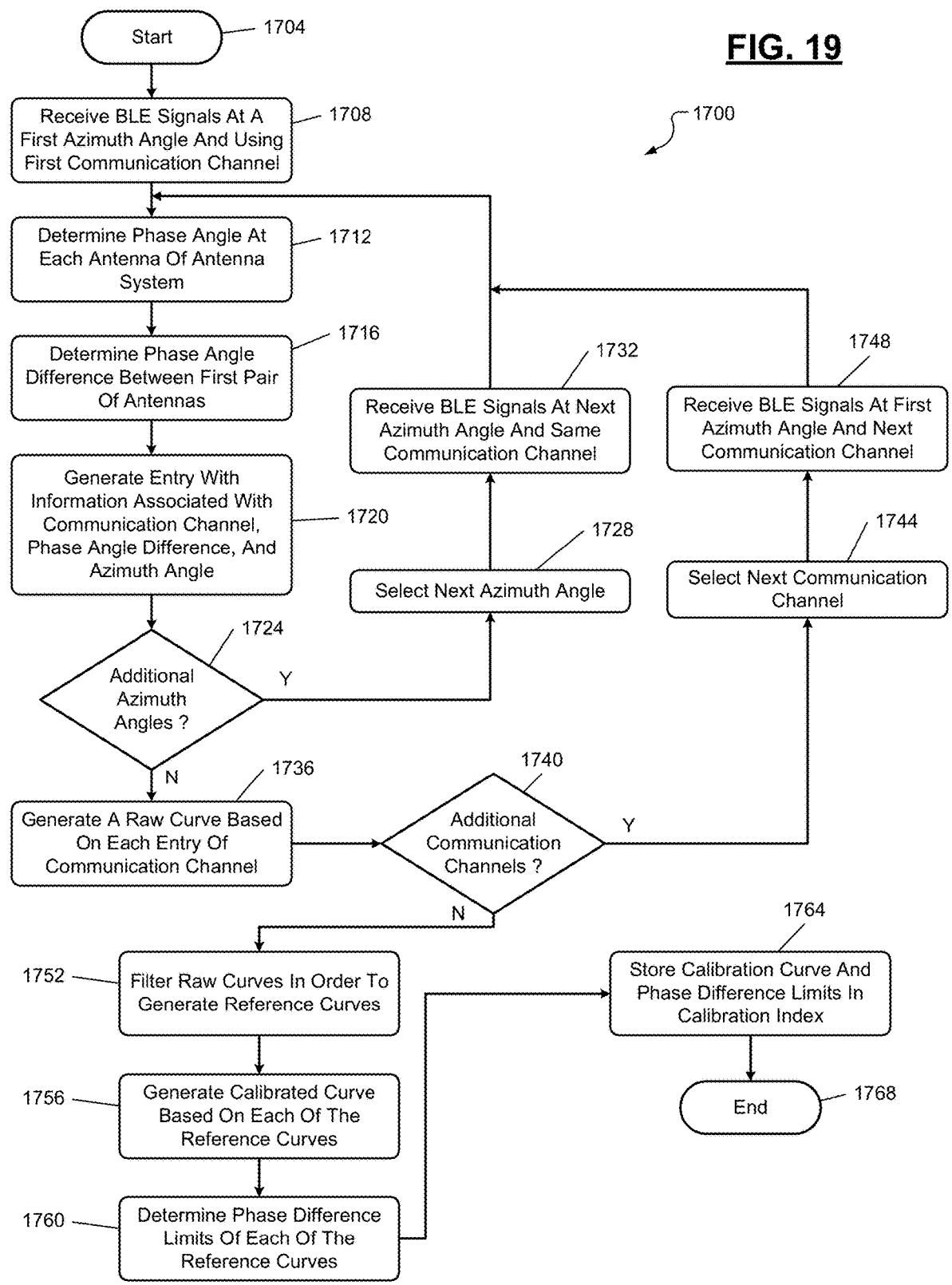

With reference to FIG. 19, a flowchart of a control algorithm 1700 for generating the calibration curve and determining the phase angle difference limits for each communication channel is shown. The control algorithm 1700 begins at 1704 when, for example, an operator turns on the portable device 10 and calibration of the electronics system 4 is initiated. At 1708, the control algorithm 1700 receives, using the antenna system 58, BLE signals at a first azimuth angle and using a first communication channel. At 1712, the control algorithm 1700 determines, using the microcontroller 350, the phase angle at each antenna 60 (or 60') of the antenna system 58. At 1716, the control algorithm 1700 determines a phase angle difference between a first pair of antennas 60 of the antenna system 58. At 1720, the control algorithm 1700 generates, using the microcontroller 350, an entry that includes information associated with the communication channel, the phase angle difference, and the azimuth angle.

At 1724, the control algorithm 1700 determines whether additional azimuth angles need to be tested for generating the raw curve. If so, the control algorithm 1700 proceeds to 1728; otherwise, the control algorithm 1700 proceeds to 1736. At 1728, the control algorithm 1700 selects the next azimuth angle and then proceeds to 1732. At 1732, the control algorithm 1700 receives, using the antenna system 58, BLE signals at the next azimuth angle and using the same communication channel and then proceeds to 1712.

At 1736, the control algorithm 1700 generates a raw curve based on each entry of the communication channel. At 1740, the control algorithm 1700 determines whether there are additional communication channels that need to be tested for generating the calibration curve. If so, the control algorithm 1700 proceeds to 1744; otherwise, the control algorithm 1700 proceeds to 1752. At 1744, the control algorithm 1700 selects the next communication channel and then proceeds to 1748. At 1748, the control algorithm 1700 receives, using the antenna system 58, BLE signals at the first azimuth angle and using the next communication channel and then proceeds to 1712.

At 1752, the control algorithm 1700 filters, using the microcontroller 350, the raw curves to generate the reference curves. As an example, the microcontroller 350 may be configured to apply a digital low-pass filter, such as an equiripple finite impulse response (FIR) low-pass filter, to the raw curves in order to generate the reference curves. At 1756, the control algorithm 1700 generates, using the microcontroller 350, the calibrated curve based on each of the reference curves. As an example, the calibrated curve may be generating by interpolating (e.g., averaging) each of the reference curves. At 1760, the control algorithm 1700 determines, using the microcontroller 350, the phase angle difference limits of each of the filtered curves, as described above with reference to FIG. 15. At 1764, the control algorithm 1700 stores, using the microcontroller 350, the calibration curve and phase angle difference limits for each communication channel in the calibration index 430 and then ends at 1768.

Figure 20:
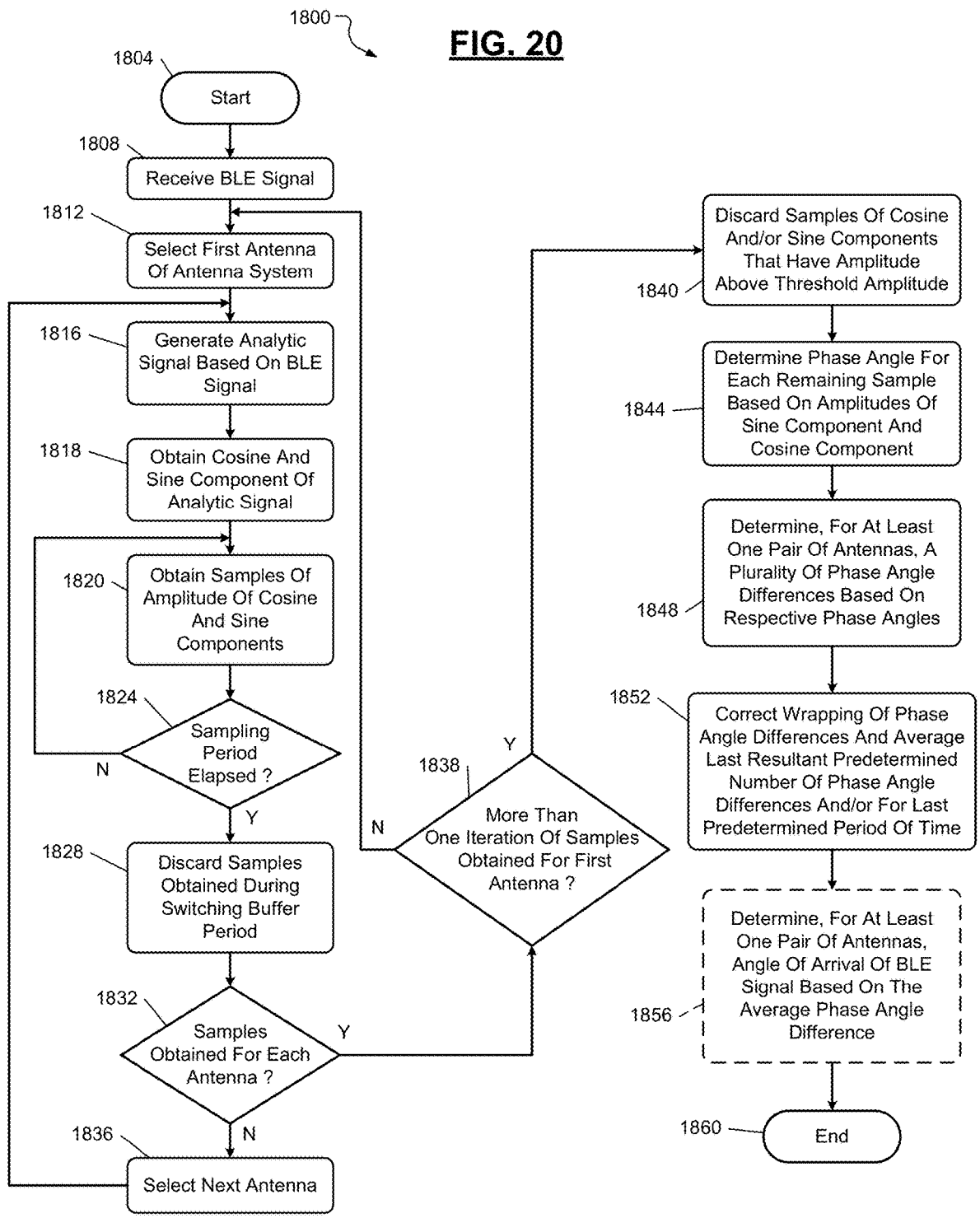

With reference to FIG. 20, a flowchart of a control algorithm 1800 for determining a phase angle difference between a pair of antennas 60 of the antenna system 58 is shown. The control algorithm 1800 begins at 1804 when, for example, control algorithm 1600 executes step 1616 or control algorithm 1700 executes step 1716 described above with reference to FIG. 18 and FIG. 19, respectively. At 1808, the control algorithm 1800 receives, using the antenna system 58, the BLE signal. At 1812, the control algorithm 1800 selects, using the switching circuit 170, the first antenna 60-1 of the antenna system 58. At 1816, the control algorithm 1800 generates, using the microcontroller 350, the analytic signal based on the BLE signal. At 1818, the control algorithm 1800 obtains, using the microcontroller 350, a cosine component and a sine component of the analytic signal. At 1820, the control algorithm 1800 obtains, using the microcontroller 350, samples of the amplitude of the cosine component and the sine component.

At 1824, the control algorithm 1800 determines, using the microcontroller 350, whether a sampling period has elapsed. As an example, the sampling period may be associated with a switching rate of the switching circuit 170. In one embodiment, the switching rate may be 4 μs. If the sampling period has elapsed, the control algorithm 1800 proceeds to 1828; otherwise, the control algorithm 1800 proceeds to 1820. At 1828, the control algorithm 1800 discards, using the microcontroller 350, samples obtained during a switching period buffer period. The switching period buffer period may be associated with a switching delay of the switching circuit 170, and includes at least one of a turn-on delay period and a turn-off delay period of the switching circuit 170. At 1832, the control algorithm 1800 determines, using the microcontroller 350, whether amplitude samples were obtained for each antenna 60 of the antenna system 58. If so, the control algorithm 1800 proceeds to 1838; otherwise, the control algorithm 1800 proceeds to 1836, where the control algorithm 1800 selects the next antenna 60 and then proceeds to 1816.

At 1838, the control algorithm 1800 determines, using the microcontroller 350, whether more than one iteration of amplitude samples were obtained for the first antenna 60-1. If so, the control algorithm 1800 proceeds to 1840; otherwise, the control algorithm 1800 proceeds to 1812. At 1840, the control algorithm 1800 may discard, using the microcontroller 350, samples of cosine and/or sine components that have a magnitude that is too far from an average magnitude and/or above a predefined threshold value. At 1844, the control algorithm 1800 determines, using the microcontroller 350, a phase angle for each remaining sample based on amplitude of sine component and amplitude of corresponding cosine component. As an example, the phase difference determination module 405 may be configured to determine the phase angle by executing an arctangent function of an amplitude of a sine component and a corresponding amplitude of a cosine component.

At 1848, the control algorithm 1800 determines, for at least one pair of antennas 60 of the antenna system 58 and using the microcontroller 350, a plurality of phase angle differences based on the respective phase angles. As an example, during the sampling period and for the first antenna 60-1, the microcontroller 350 may obtain eight samples of an amplitude of the sine component and eight samples of an amplitude of the cosine component, and using these samples, the phase difference determination module 405 may determine eight phase angles, as described above. Subsequently, the microcontroller 350 repeats these steps in order to obtain eight phase angles for the second antenna 60-2 and/or the third antenna 60-3, and eight additional phase angles for the first antenna 60-1. Based on the differences between corresponding phase angle samples of a pair of antennas (i.e., a first sample of the first iteration of phase angles of antenna 60-1, a first sample of the first iteration of phase angles of antenna 60-2 or antenna 60-3, and a first sample of the second iteration of phase angles of antenna 60-1), a distance separating the respective pair of antennas 60, and a number of samples obtained during each iteration, the phase difference determination module 405 may determine the phase angle difference between the respective pair of antennas 60. In some embodiments, the phase difference determination module 405 may perform a phase angle unwrapping algorithm on the 0 Hz IF IQ signals in order to improve the accuracy of the phase angle difference determination.

Phase angle unwrapping consists of projecting phase angles forward past a natural circular wrap point (e.g., 180° (or $\pi$), or −180° (or −$\pi$)) by adding 360 degrees to each point that would otherwise wrap. In cases where the slope of the phase angles over time is such that multiple wraps may have occurred, multiple 360 ($2\pi$) additions may be added to interpolate a best fit same slope lines for the antennas. After unwrapping, the differences in the y intercept of the best fit same slope lines for the antennas are used to determine the phase differences. This is illustrated by FIG. 21.

Figure 21:
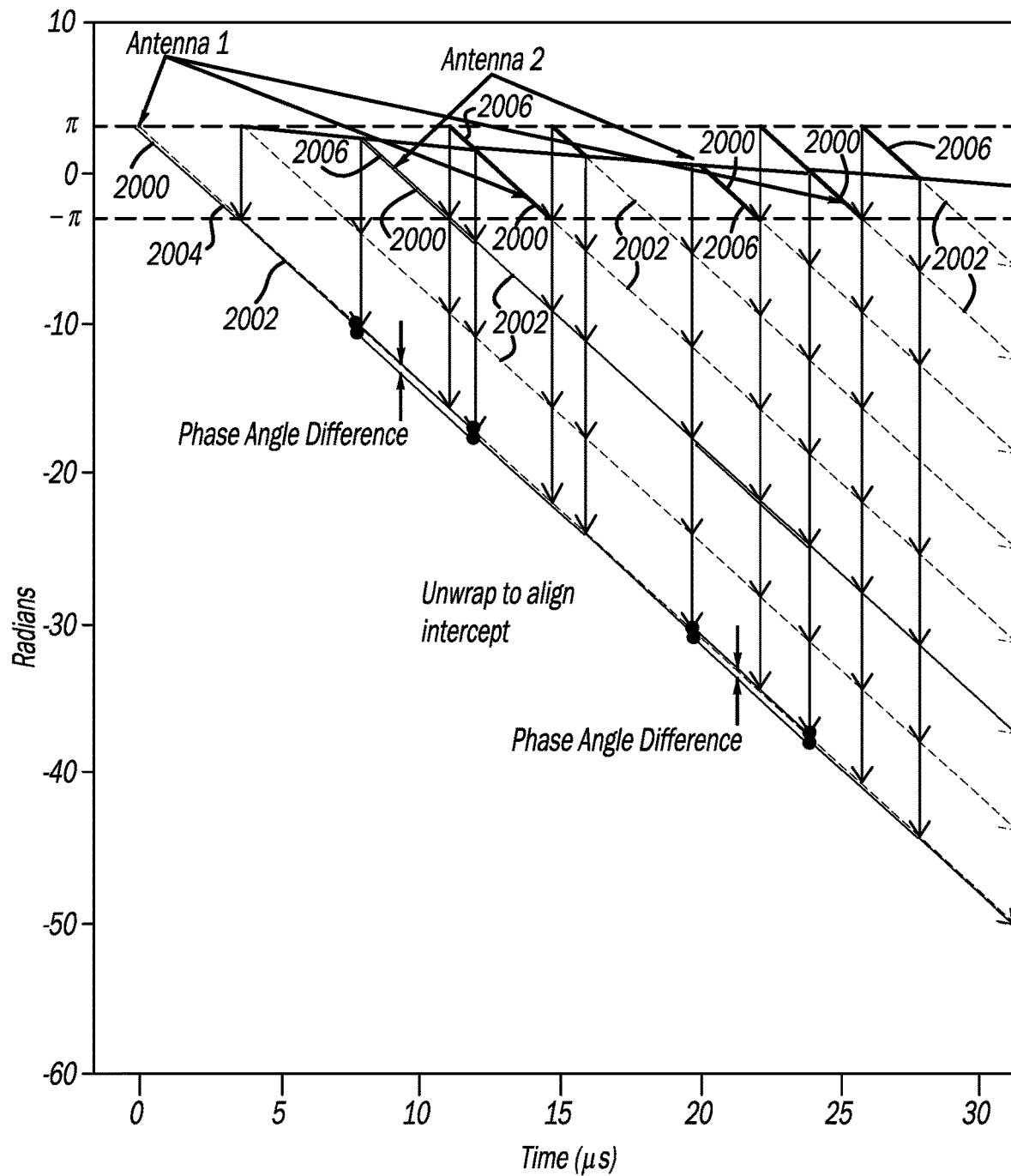
FIG. 21 is a phase angle vs. time plot provided as an example unwrapping and aligning of phase angle points for phase angle difference determinations in accordance with an embodiment of the present disclosure.

In FIG. 21, line segments 2000 representing a time series of phase angle samples in radians are shown for a first antenna and a second antenna. The line segments 2000 are first unwrapped, such that data samples to not transition from, for example, −180° to 180°, but rather continue in a same (or for this example in a negative direction). A portion of the points of the line segments 2000 for each of the antennas are then selected. As an example, this may include a last valid portion of the points of each of the line segments 2000.

Subsequent to selecting the portion of points, a best fit same slope for the line segments 2000 is determined. Since each of the antennas are receiving a RF signal having the same frequency (e.g., 250 kHz), the slopes of the line segments 2000 are the same or nearly the same. The best or average slope for the samples of the antennas may be calculated and a best-fit intercept of each set of line segments 2000 (one line segment for the first antenna and another line segment for the second antenna) is determined using the calculated slope. Projected lines 2002 extending along the line segments 2000 are then generated. Next a number of multiples of $2\pi$ is determined that needs to be added to each line segment 2006 that occurred in time subsequent to a first one of the line segment 2000 (or first line segment 2004) that would place the line segments 2006 on or within ±$\pi$ of the projected line of the first line segment 2004. The line segments (or sets of line segments) 2006 may be moved down by $2\pi$ at a time until corresponding Y intercepts of projected lines of the line segments 2006 are within ±$\pi$ radians of the Y intercept of the projected line of the first line segment 2004. Certain samples of the antennas that are not close (e.g., not within ±$0.5\pi$) to the projected line of the first line segment 2004 may be discarded.

In one embodiment, the line segments for the first antenna may occur earlier in time and thus are shifted to align in time with the line segments for the second antenna or vice versa. The phase difference between the two antennas is the difference between the Y intercepts mod $2\pi$ minus $\pi$ of the projected lines of the resultant line segments or [(Antenna2Yintercept−Antenna1Yintercept)mod $2\pi$]−$\pi$. Example phase differences between the shifted and aligned line segments are shown in FIG. 21.

After unwrapping, the differences of the y intercept of the best fit same slope lines for the antennas can be used to determine the phase differences. In some embodiments, when the natural antenna spacing of the outer pair of antennas is close to a multiple of 180 degrees in phase difference for azimuth angles of +/−90 degrees azimuth, noise and multipath interference may cause the phase differences to wrap. Note that phase angle wrapping and phase difference wrapping are two different phenomena. Phase difference unwrapping is described with respect to FIGS. 22-23, where phase difference unwrapping for a 3 antenna system such as that disclosed is shown. A three antenna system may include three antennas disposed in a line (or in a row) and include first, second and third antennas, where the second (or center) antenna is disposed between the first and third antennas (or outer left and right antennas). There are three pairs of antennas; a first pair including the outer left and right antennas, a second pair including the left antenna and center antenna, and a third pair including the center antenna and the right antenna. In one embodiment, the phase difference wrapping is corrected based on phase difference between at least one of (i) the left antenna and the center antenna, or (ii) the center antenna and the right antenna. The physical distance between the outer antennas is such that the phase angle differences change between −180° and 180°. The physical distances between the other pairs of antennas is half the distance between the outer antennas, such that the phase angle differences as shown in FIG. 23 is between the −90° and 90°.

Figure 22:
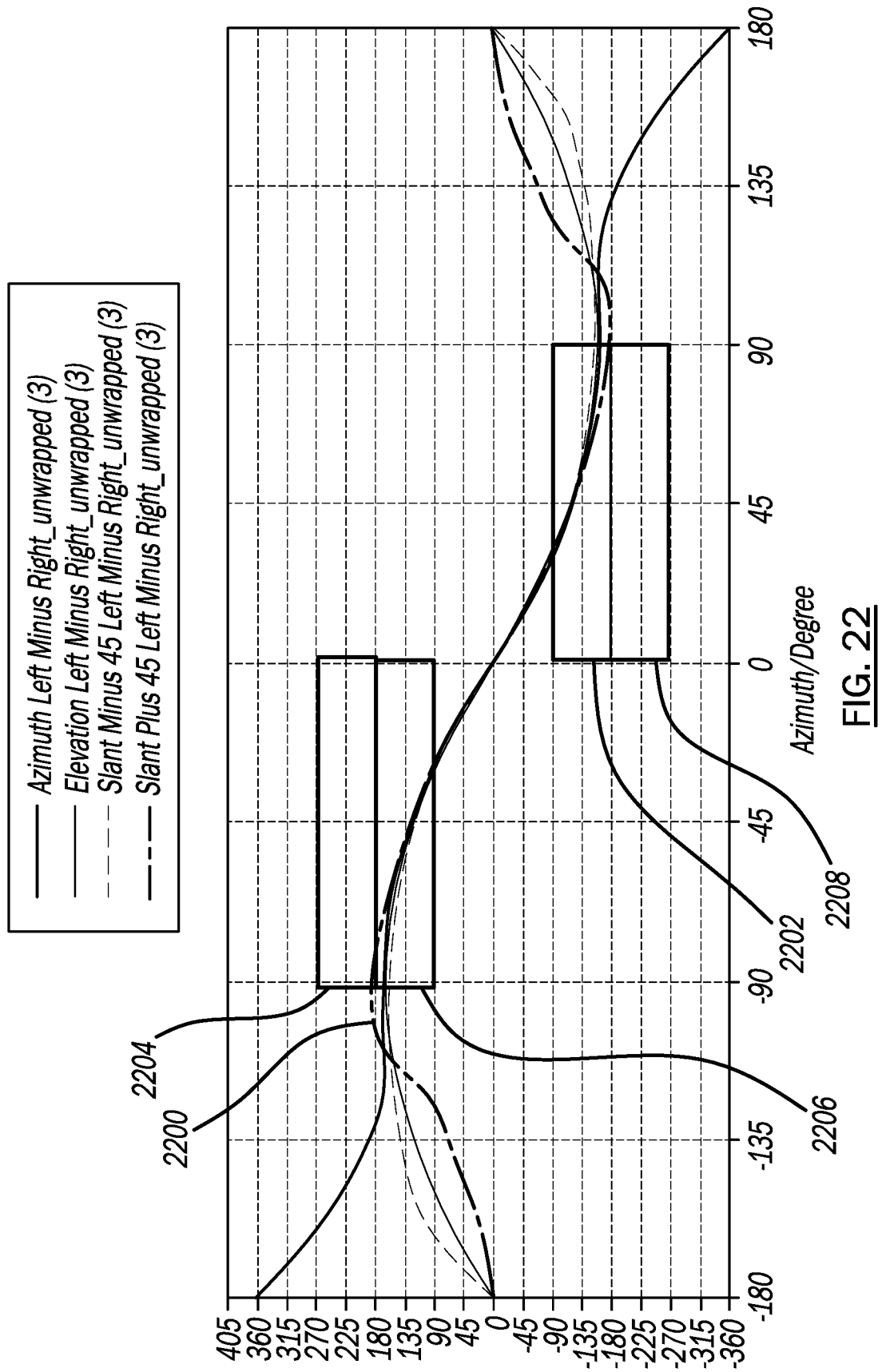
FIG. 22 is a phase angle difference vs azimuth angle plot illustrating differences in phase for an outer pair of antennas in accordance with an embodiment of the present disclosure.
Figure 23:
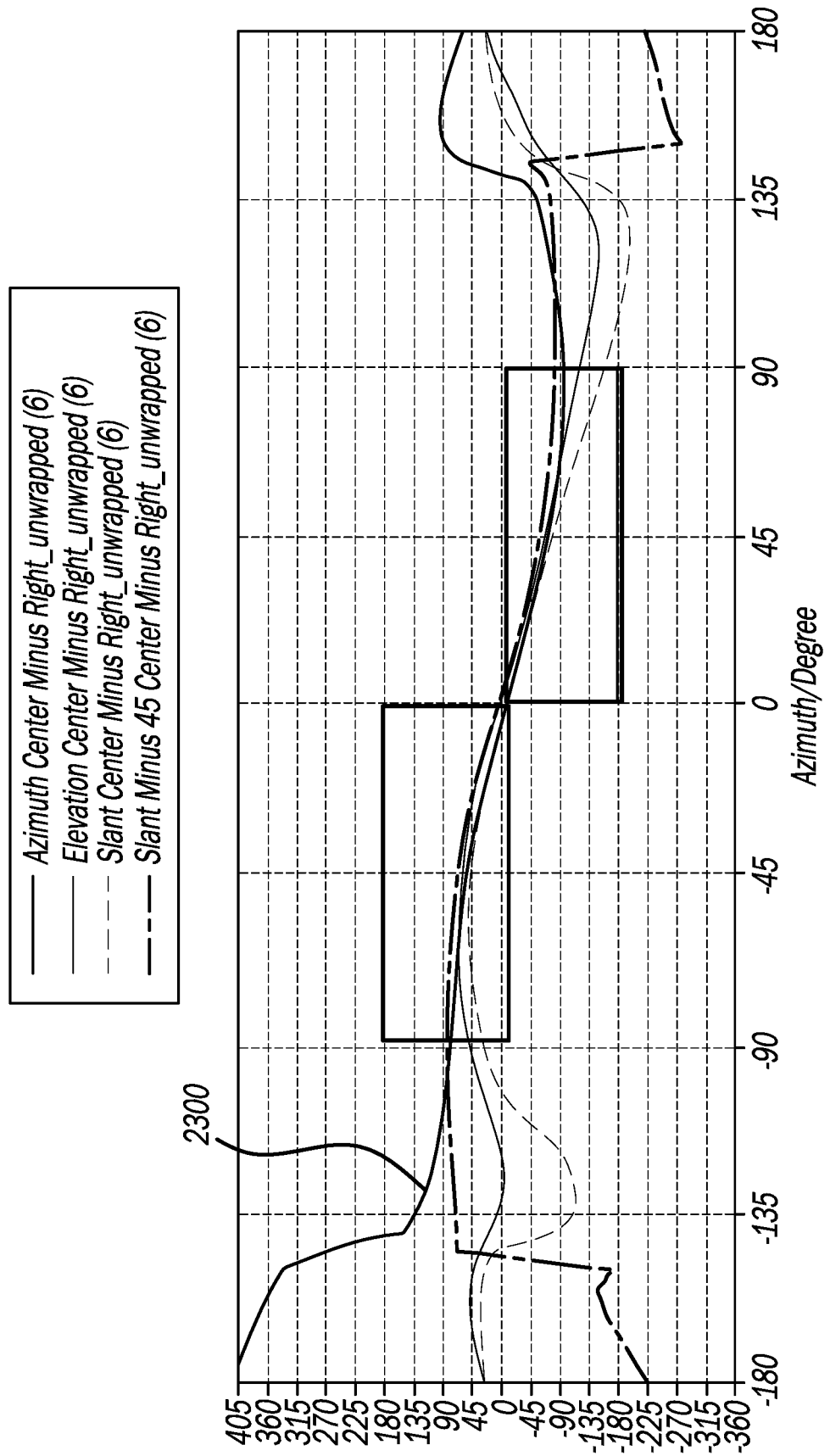
FIG. 23 is a phase angle difference vs azimuth angle plot illustrating differences in phase for an inner pair of antennas in accordance with an embodiment of the present disclosure.

FIG. 22 is a phase angle difference vs azimuth angle plot illustrating differences in phase for an outer pair of antennas. Curve 2200 is an example of azimuth left minus right (for the outer pair of antennas) unwrapped. The phase angle difference is near 0 when the azimuth angle between the I and Q components of a receive signal 0. The phase angle difference increases as the azimuth angle increases from 0 to ±90° as shown. When the azimuth angle decreases to less than −90°, the phase angle difference instead of, for example increasing from 180° to 181°, wraps to −179°. The microcontroller 350 corrects this wrapping based on the phase angle differences of the left-center and center-right antennas, such that the phase angle difference is 181° rather than −179°. This allows for a correct average phase angle difference to be determined at 1852.

When the magnitude of the phase angle difference between the outer antennas is greater than and/or exceeds 180°, the phase angle difference between the left-center and center-right antennas is checked and if the magnitudes of phase angle differences is for the outer pair of antennas is between 90-180°, then the sign of the phase angle difference for the outer antennas is corrected including the sign of the phase angle difference and changing the value of the phase angle difference. Curve 2300 is an example of azimuth center minus right (for one of the inner pair of antennas) unwrapped. In an embodiment, phase angle differences that are greater than a maximum threshold value (e.g., 180°) or less than minimum threshold value (e.g., −180°) are projected to be where the phase angle differences should be if wrapping did not occur. During unwrapping phase angle differences that fall in box 2202 may be unwrapped to be in box 2204 and phase angle differences that fall in box 2206 may be unwrapped to be in box 2208. By correcting the phase angle differences as describe, a correct average phase angle is provided.

The phase angle differences for a last predetermined period of time (e.g., 30 seconds) and/or the last predetermined number of phase angle differences may be averaged. In an embodiment, if the average of the phase angle differences for the left-center antenna signal and/or the phase angle differences for the center-right antenna signal for the last predetermined period is greater than 0° and the phase angle difference for the outer antenna pair is less than −90°, then the corresponding outer antenna pair phase angle difference is mapped to a value equal to the outer antenna phase angle difference plus 360°. Similarly, if the average of the phase angle differences for the left-center antenna signal and/or the phase angle differences for the center-right antenna signal for the last predetermined period is less than 0° and the phase angle difference for the outer antenna pair is greater than 90°, the corresponding outer antenna pair phase angle difference is mapped to a value equal to the outer antenna phase angle difference minus 360°. This is illustrated by corresponding portions of the boxes of FIGS. 22-23.

At 1856, the control algorithm 1800 of the microcontroller 350 or the control module 20 of the vehicle may determine, for the at least one pair of antennas 60 of the antenna system 58, an angle of arrival of the BLE signal based on the average phase angle difference of the remaining phase angle differences of the respective at least one pair of antennas. At 1860, the control algorithm 1800 may end. As an alternative, the angle of arrival may be determined by the control module 20 of the vehicle. In this alternative embodiment, the sensor 31 may transmit to the control module 20 the average phase angle difference of the remaining phase angle differences of the respective at least one pair of antennas.

Figure 24:
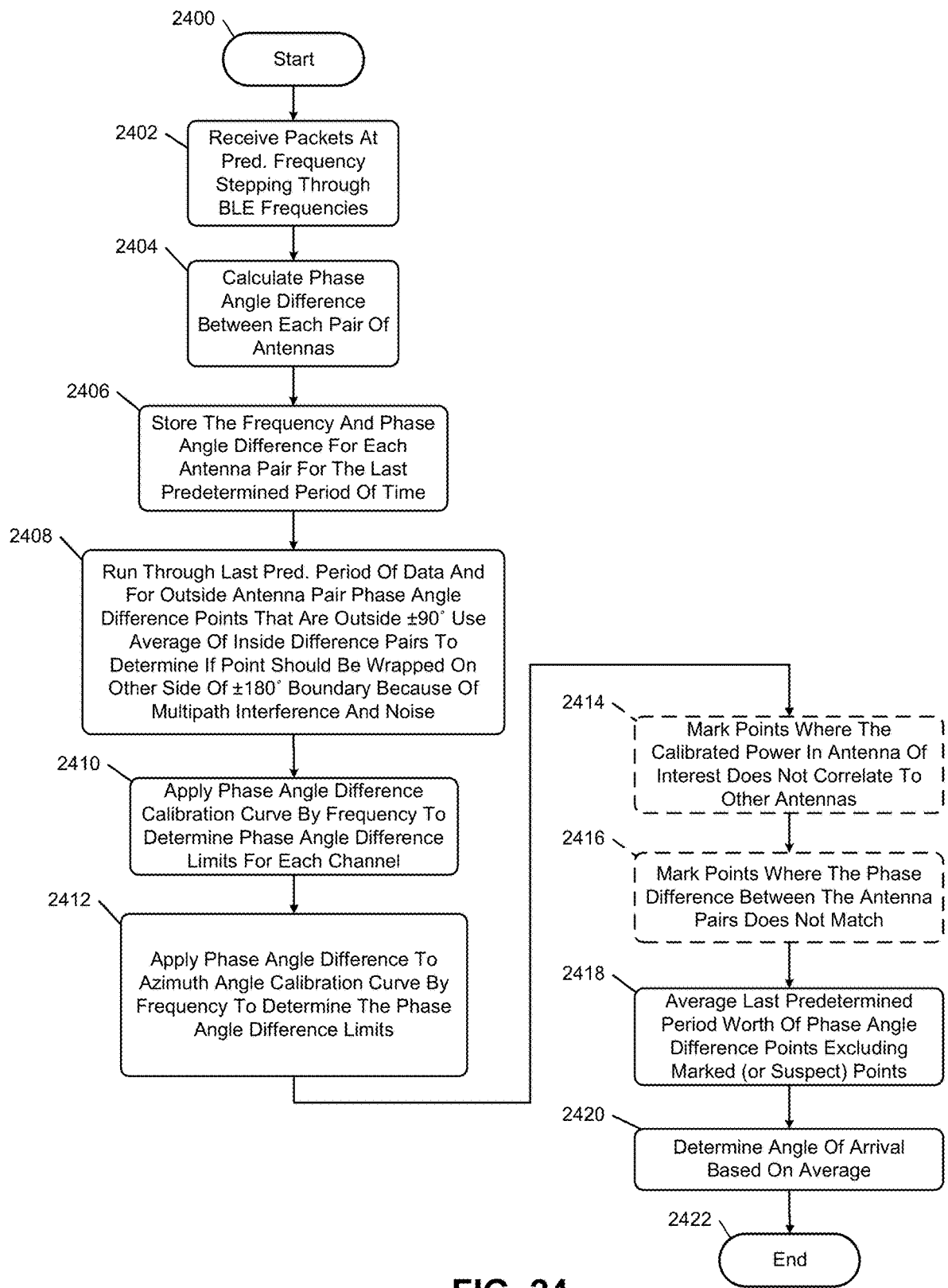
FIG. 24 is illustrates a method of determining angle of arrival in accordance with an embodiment of the present disclosure.

In FIG. 24, another example method of determining angle of arrival is shown. This method includes taking multiple readings on multiple channels, which are averaged. Some readings are marked for removal. The angle of arrival determination method may be implemented by the sensor 31, the microcontroller 350, or the control module 20. The operations of the method may be iteratively performed as with the operations of the other methods disclosed herein. The method of FIG. 24 may begin at 2400. At 2402, the antennas 60 (or 60') receive signals at a predetermined frequency (e.g., 30 Hz) stepping through BLE frequencies. At 2404, the microcontroller 350 determines the phase angle differences for each of the pairs of antennas (the outer pair, the left-center pair and the center-right pair) for the signals received at the frequencies.

At 2406, the microcontroller 350 stores the frequencies along with the corresponding phase angle differences for a last predetermined period (e.g., 1 second) in memory. At 2408, the microcontroller 350 reviews the phase angle differences to determine if any phase angle difference wrapping has occurred and corrects the phase angle difference wrapping of the outer pair of antennas based on the phase angle differences for the inner pairs (left-center and center-right) of antennas as described above.

At 2410, the microcontroller 350 applies a phase angle difference calibration curve as described above by frequency to determine phase angle difference limits for each channel. At 2412, the microcontroller 350 applies a phase angle difference to azimuth angle calibration curve by frequency to determine the phase angle difference limits.

The following operations 2414 and 2416 may be performed or skipped depending on the application. In one embodiment, operations 2414 and 2416 are not performed. At 2414, the microcontroller 350 may mark where the calibrated power in antenna of interest does not correlate to other antennas. For example of the calibrated power for one antenna is more than a predetermined amount different than the calibrated power for each of the other antennas.

At 2416, the microcontroller 350 marks points where the phase angle difference between the antenna pairs does not match. At 2418, the microcontroller 350 averages last predetermined period worth of phase angle difference points excluding marked (or suspect) points. At 2420, the microcontroller 350 determines the angle of arrival of the antennas based on the averages of the phase angle differences between the antennas. This includes the microcontroller 350 determining an azimuth angle between network (or mobile) device and the antennas. The method may end at 2422.

Subsequent to performing the methods of FIGS. 21 and/or 24, the control module 20 may determine a location of the portable device 10 and/or distance between the portable device 10 and the vehicle 30 based on angle of arrivals determined for at least one of the antennas 60 of the respective sensors 31. As an example, the control module 20 may determine that the portable device 10 is located at an intersection of a first line representative of the angle of arrival at a first sensor 31A and a second line representative of the angle of arrival at a second sensor 31B.

FIG. 25 shows a receiving circuit 2500 for determining a phase angle between in-phase and quadrature components of a received radio frequency signal. The receiving circuit 2500 includes an antenna 2502, such as one of the antennas 60, 60' described above, mixers 2504, 2506, low pass filters 2508, 2510, analog-to-digital converters 2512, 2514 and a 0 Hz IF converter 2516. The mixers 2504, 2506 may receive a RF signal having a carrier frequency (e.g., 2.402 GHz signal) and a continuous wave (CW) tone signal (e.g., ±250 KHz) and remove the carrier wave signal to provide the CW tone signal. The signals out of the mixers are 90° phase shifted from each other and provided to the low pass filters 2508, 2510. Outputs of the low pass filters 2508, 2510 are then converted to digital signal and provided to the 0 Hz IF converter 2516 to provide the in-phase and quadrature phase signal from which a phase angle may be determined. The phase angle vector associated with the in-phase and quadrature phase signals rotates at the frequency of the CW tone signal (e.g., rotates at 250 KHz) about an origin of the corresponding I, Q coordinate plot.

In accordance with the present teachings, a method includes receiving, using an antenna system, a signal via a first communication channel, wherein the antenna system receives the signal at a plurality of azimuth angles. The method also includes determining, using a processing circuit that is configured to execute instructions stored in a non-transitory computer readable medium, a plurality of first communication channel phase angle differences between a pair of antennas of the antenna system, wherein each of the plurality of first communication channel phase angle differences corresponds to one of the plurality of azimuth angles. The method also includes receiving, using the antenna system, a second signal via a second communication channel, wherein the antenna system receives the second signal at the plurality of azimuth angles. The method also includes determining, using the processing circuit, a plurality of second communication channel phase angle differences between the pair of antennas, wherein each of the plurality of second communication channel phase angle differences corresponds to one of the plurality of azimuth angles. The method also includes generating, using the processing circuit, a first reference curve based on the plurality of first communication channel phase angle differences. The method also includes generating, using the processing circuit, a second reference curve based on the plurality of second communication channel phase angle differences. The method also includes generating, using the processing circuit, a calibration curve, wherein the calibration curve is based on an interpolation of the first reference curve and the second reference curve.

In other features, the method further includes determining, using the processing circuit, a plurality of phase angle difference limits, wherein each of the plurality of phase angle difference limits is associated with one of the first communication channel and second communication channel.

In other features, the method further includes storing, using the processing circuit, the calibration curve and the plurality of phase angle difference limits in a calibration index, wherein calibration index values of the calibration index vary by radio frequency or communication channel.

In other features, generating the first reference curve further comprises filtering, using the processing circuit, the first communication channel phase angle differences using a low-pass filter.

In other features, generating the second reference curve further comprises filtering, using the processing circuit, the second communication channel phase angle differences using the low-pass filter.

In other features, the low-pass filter is a finite impulse response low-pass filter.

In other features, the interpolation of the first reference curve and the second reference curve is an average of (i) the phase angle difference of the first reference curve and (ii) the phase angle difference of the second reference curve.

In other features, the method further includes generating, using the processing circuit, a plurality of additional reference curves, wherein each of the plurality of additional reference curves is associated with one of each remaining communication channel of the antenna system.

In other features, the method further includes generating, using the processing circuit, the calibration curve based on an interpolation of the first reference curve, the second reference curve, and each of the plurality of additional reference curves.

In other features, the first communication channel, the second communication channel, and each of the remaining communication channels are associated with a Bluetooth communication system.

In accordance with the present teachings, a system includes an antenna system, wherein the antenna system is configured to receive a signal via a first communication channel, wherein the antenna system receives the signal at a plurality of azimuth angles, and a second signal via a second communication channel, wherein the antenna system receives the second signal at the plurality of azimuth angles. The system further includes processing circuit that is configured to execute instructions stored in a non-transitory computer readable medium, wherein the instructions include determining, using the processing circuit, a plurality of first communication channel phase angle differences between a pair of antennas of the antenna system, wherein each of the plurality of first communication channel phase angle differences corresponds to one of the plurality of azimuth angles, determining, using the processing circuit, a plurality of second communication channel phase angle differences between the pair of antennas, wherein each of the plurality of second communication channel phase angle differences corresponds to one of the plurality of azimuth angles, generating, using the processing circuit, a first reference curve based on the plurality of first communication channel phase angle differences, generating, using the processing circuit, a second reference curve based on the plurality of second communication channel phase angle differences, and generating, using the processing circuit, a calibration curve, wherein the calibration curve is based on an interpolation of the first reference curve and the second reference curve.

In other features, the instructions further include determining, using the processing circuit, a plurality of phase angle difference limits, wherein each of the plurality of phase angle difference limits is associated with one of the first communication channel and second communication channel.

In other features, the instructions further include storing, using the processing circuit, the calibration curve and the plurality of phase angle difference limits in a calibration index.

In other features, generating the first reference curve further includes filtering, using the processing circuit, the first communication channel phase angle differences using a low-pass filter.

In other features, generating the second reference curve further includes filtering, using the processing circuit, the second communication channel phase angle differences using the low-pass filter.

In other features, the low-pass filter is a finite impulse response low-pass filter.

In other features, the interpolation of the first reference curve and the second reference curve is an average of (i) the phase angle difference of the first reference curve and (ii) the phase angle difference of the second reference curve.

In other features, the instructions further include generating, using the processing circuit, a plurality of additional reference curves, wherein each of the plurality of additional reference curves is associated with one of each remaining communication channel of the antenna system.

In other features, the instructions further include generating, using the processing circuit, the calibration curve based on an interpolation of the first reference curve, the second reference curve, and each of the plurality of additional reference curves.

In other features, the first communication channel, the second communication channel, and each of the remaining communication channels are associated with a Bluetooth communication system.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method comprising:
receiving, using an antenna system, a signal via a first communication channel, wherein the antenna system receives the signal at a plurality of azimuth angles;
determining, using a processing circuit that is configured to execute instructions stored in a non-transitory computer readable medium, a plurality of first communication channel phase angle differences between a pair of antennas of the antenna system, wherein each of the plurality of first communication channel phase angle differences corresponds to one of the plurality of azimuth angles;
receiving, using the antenna system, a second signal via a second communication channel, wherein the antenna system receives the second signal at the plurality of azimuth angles;
determining, using the processing circuit, a plurality of second communication channel phase angle differences between the pair of antennas, wherein each of the plurality of second communication channel phase angle differences corresponds to one of the plurality of azimuth angles;
generating, using the processing circuit, a first reference curve based on the plurality of first communication channel phase angle differences, wherein the first reference curve relates the first communication channel phase angle differences to the plurality of azimuth angles;
generating, using the processing circuit, a second reference curve based on the plurality of second communication channel phase angle differences, wherein the second reference curve relates the second communication channel phase angle differences to the plurality of azimuth angles;
generating, using the processing circuit, a calibration curve, wherein the calibration curve is based on an interpolation of the first reference curve and the second reference curve, is not channel specific, and relates a plurality of phase angle differences to the plurality of azimuth angles;
determining a location of a portable access device based on the calibration curve; and
providing access to a vehicle based on the location of the portable access device relative to the vehicle.

2. The method of claim 1, further comprising:
determining, using the processing circuit, a plurality of phase angle difference limits, wherein each of the plurality of phase angle difference limits is associated with one of the first communication channel and the second communication channel; and
determining the location of the portable access device based on the plurality of phase angle difference limits.

3. The method of claim 2, further comprising storing, using the processing circuit, the calibration curve and the plurality of phase angle difference limits in a calibration index,
wherein calibration index values of the calibration index vary by radio frequency or communication channel.

4. The method of claim 1, wherein generating the first reference curve further comprises filtering, using the processing circuit, the first communication channel phase angle differences using a low-pass filter.

5. The method of claim 4, wherein generating the second reference curve further comprises filtering, using the processing circuit, the second communication channel phase angle differences using the low-pass filter.

6. The method of claim 5, wherein the low-pass filter is a finite impulse response low-pass filter.

7. The method of claim 1, wherein the interpolation of the first reference curve and the second reference curve includes averaging (i) a phase angle difference of the first reference curve and (ii) a phase angle difference of the second reference curve.

8. The method of claim 1, further comprising generating, using the processing circuit, a plurality of additional reference curves, wherein each of the plurality of additional reference curves is associated with one of each remaining communication channel of the antenna system.

9. The method of claim 8, further comprising generating, using the processing circuit, the calibration curve based on an interpolation of the first reference curve, the second reference curve, and each of the plurality of additional reference curves.

10. The method of claim 8, wherein the first communication channel, the second communication channel, and each of the remaining communication channels are associated with a Bluetooth communication system.

11. A system comprising:
an antenna system, wherein the antenna system is configured to receive
 a signal via a first communication channel, wherein the antenna system receives the signal at a plurality of azimuth angles, and
 a second signal via a second communication channel, wherein the antenna system receives the second signal at the plurality of azimuth angles; and
processing circuit that is configured to execute instructions stored in a non-transitory computer readable medium, wherein the instructions include
 determining, using the processing circuit, a plurality of first communication channel phase angle differences between a pair of antennas of the antenna system, wherein each of the plurality of first communication channel phase angle differences corresponds to one of the plurality of azimuth angles,
 determining, using the processing circuit, a plurality of second communication channel phase angle differences between the pair of antennas, wherein each of the plurality of second communication channel phase angle differences corresponds to one of the plurality of azimuth angles,
 generating, using the processing circuit, a first reference curve based on the plurality of first communication channel phase angle differences, wherein the first reference curve relates the first communication channel phase angle differences to the plurality of azimuth angles,
 generating, using the processing circuit, a second reference curve based on the plurality of second communication channel phase angle differences, wherein the second reference curve relates the second communication channel phase angle differences to the plurality of azimuth angles,
 generating, using the processing circuit, a calibration curve, wherein the calibration curve is based on an interpolation of the first reference curve and the second reference curve, is not channel specific, and relates a plurality of phase angle differences to the plurality of azimuth angles;
 determining a location of a portable access device based on the calibration curve; and
 providing access to a vehicle based on the location of the portable access device relative to the vehicle.

12. The system of claim 11, wherein:
the instructions further comprise determining, using the processing circuit, a plurality of phase angle difference limits, wherein each of the plurality of phase angle difference limits is associated with one of the first communication channel and the second communication channel; and
 determining the location of the portable access device based on the plurality of phase angle difference limits.

13. The system of claim 12, wherein the instructions further comprise storing, using the processing circuit, the calibration curve and the plurality of phase angle difference limits in a calibration index.

14. The system of claim 11, wherein generating the first reference curve further comprises filtering, using the processing circuit, the first communication channel phase angle differences using a low-pass filter.

15. The system of claim 14, wherein generating the second reference curve further comprises filtering, using the processing circuit, the second communication channel phase angle differences using the low-pass filter.

16. The system of claim 15, wherein the low-pass filter is a finite impulse response low-pass filter.

17. The system of claim 11, wherein the interpolation of the first reference curve and the second reference curve includes averaging (i) a phase angle difference of the first reference curve and (ii) a phase angle difference of the second reference curve.

18. The system of claim 11, wherein the instructions further comprise generating, using the processing circuit, a plurality of additional reference curves, wherein each of the plurality of additional reference curves is associated with one of each remaining communication channel of the antenna system.

19. The system of claim 18, wherein the instructions further comprise generating, using the processing circuit, the calibration curve based on an interpolation of the first reference curve, the second reference curve, and each of the plurality of additional reference curves.

20. The system of claim 18, wherein the first communication channel, the second communication channel, and each of the remaining communication channels are associated with a Bluetooth communication system.

21. The method of claim 1, wherein each antenna of the pair of antennas is a quadrifilar antenna.

22. The method of claim 1, wherein each antenna of the antenna system is a quadrifilar antenna.

23. The method of claim 1, further comprising:
reviewing phase angle differences determined for a last predetermined period of time to determine if phase angle difference wrapping has occurred; and
correcting the phase angle difference wrapping of an outer pair of antennas based on phase angle differences for inner pairs of antennas.

24. The method of claim 1, further comprising:
marking first points where calibrated power in an antenna of interest does not correlate to other antennas of the antenna system;
marking second points where a phase angle difference between two antenna pairs of the antenna system do not match;
averaging a last predetermined period of phase angle difference points excluding the marked first points and the marked second points; and
determining angles of arrival of antennas of the antenna system based on the average of the phase angle difference points.

* * * * *